(12) United States Patent
Waldern et al.

(10) Patent No.: US 11,513,350 B2
(45) Date of Patent: Nov. 29, 2022

(54) WAVEGUIDE DEVICE WITH UNIFORM OUTPUT ILLUMINATION

(71) Applicant: DigiLens Inc., Sunnyvale, CA (US)

(72) Inventors: Jonathan David Waldern, Los Altos Hills, CA (US); Alastair John Grant, San Jose, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 141 days.

(21) Appl. No.: 16/465,834

(22) PCT Filed: Jan. 26, 2018

(86) PCT No.: PCT/US2018/015553
§ 371 (c)(1),
(2) Date: May 31, 2019

(87) PCT Pub. No.: WO2018/102834
PCT Pub. Date: Jun. 7, 2018

(65) Prior Publication Data
US 2020/0026074 A1    Jan. 23, 2020

Related U.S. Application Data

(60) Provisional application No. 62/499,423, filed on Jan. 26, 2017, provisional application No. 62/497,781, filed on Dec. 2, 2016.

(51) Int. Cl.
*G02B 27/01*     (2006.01)
*F21V 8/00*      (2006.01)
*G02B 27/00*     (2006.01)

(52) U.S. Cl.
CPC ....... *G02B 27/0172* (2013.01); *G02B 6/0016* (2013.01); *G02B 6/0076* (2013.01);
(Continued)

(58) Field of Classification Search
CPC .. G02B 6/0016; G02B 6/0018; G02B 6/0033; G02B 6/0035; G02B 6/105; G02B 27/0093; G02B 27/017; G02B 27/0172
(Continued)

(56) References Cited

U.S. PATENT DOCUMENTS

| 1,043,938 A | 11/1912 | Huttenlocher |
| 2,141,884 A | 12/1938 | Sonnefeld |

(Continued)

FOREIGN PATENT DOCUMENTS

| BR | PI 0720469 A2 | 1/2014 |
| CA | 2889727 A1 | 6/2014 |

(Continued)

OTHER PUBLICATIONS

Brown, "Waveguide Displays", Rockwell Collins, 2015, 11 pgs.
(Continued)

*Primary Examiner* — Michael P Mooney
(74) *Attorney, Agent, or Firm* — KPPB LLP

(57) ABSTRACT

Various embodiments of waveguide devices are described. A debanding optic may be incorporated into waveguide devices, which may help supply uniform output illumination. Accordingly, various waveguide devices are able to output a substantially flat illumination profile eliminating or mitigating banding effects.

36 Claims, 12 Drawing Sheets

(52) U.S. Cl.
CPC ..... *G02B 27/0081* (2013.01); *G02B 27/0093* (2013.01); *G02B 27/0101* (2013.01); *G02B 27/0103* (2013.01); *G02B 2027/0114* (2013.01); *G02B 2027/0116* (2013.01); *G02B 2027/0174* (2013.01)

(58) Field of Classification Search
USPC .......................................................... 385/901
See application file for complete search history.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,799,765 A | 1/1989 | Ferrer |
| 4,811,414 A | 3/1989 | Fishbine et al. |
| 4,848,093 A | 7/1989 | Simmonds et al. |
| 4,854,688 A | 8/1989 | Hayford et al. |
| 4,860,294 A | 8/1989 | Winzer et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,016,953 A | 5/1991 | Moss et al. |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,150,234 A | 9/1992 | Takahashi et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,200,861 A | 4/1993 | Moskovich et al. |
| 5,210,624 A | 5/1993 | Matsumoto et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,306,923 A | 4/1994 | Kazmierski et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissei et al. |
| 5,410,370 A | 4/1995 | Janssen |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |

(56) References Cited

U.S. PATENT DOCUMENTS

| | | |
|---|---|---|
| 5,463,428 A | 10/1995 | Lipton et al. |
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,528,720 A | 6/1996 | Winston et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,680,411 A | 10/1997 | Ramdane et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,764,414 A | 6/1998 | King et al. |
| 5,790,288 A | 8/1998 | Jager et al. |
| 5,790,314 A | 8/1998 | Duck et al. |
| 5,798,641 A | 8/1998 | Spagna et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,867,618 A | 2/1999 | Ito et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalhub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |

(56) References Cited

U.S. PATENT DOCUMENTS

| | | |
|---|---|---|
| 6,121,899 A | 9/2000 | Theriault |
| 6,127,066 A | 10/2000 | Ueda et al. |
| 6,128,058 A | 10/2000 | Walton et al. |
| 6,133,971 A | 10/2000 | Silverstein et al. |
| 6,133,975 A | 10/2000 | Li et al. |
| 6,137,630 A | 10/2000 | Tsou et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,156,243 A | 12/2000 | Kosuga et al. |
| 6,167,169 A | 12/2000 | Brinkman et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,176,837 B1 | 1/2001 | Foxlin |
| 6,185,016 B1 | 2/2001 | Popovich |
| 6,188,462 B1 | 2/2001 | Lavrentovich et al. |
| 6,191,887 B1 | 2/2001 | Michaloski et al. |
| 6,195,206 B1 | 2/2001 | Yona et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,215,579 B1 | 4/2001 | Bloom et al. |
| 6,222,297 B1 | 4/2001 | Perdue |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,285,813 B1 | 9/2001 | Schultz et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,083 B1 | 11/2001 | Johnson et al. |
| 6,317,227 B1 | 11/2001 | Mizutani et al. |
| 6,317,228 B2 | 11/2001 | Popovich et al. |
| 6,317,528 B1 | 11/2001 | Gadkaree et al. |
| 6,320,563 B1 | 11/2001 | Yang et al. |
| 6,321,069 B1 | 11/2001 | Piirainen |
| 6,323,970 B1 | 11/2001 | Popovich |
| 6,323,989 B1 | 11/2001 | Jacobson et al. |
| 6,324,014 B1 | 11/2001 | Moskovich et al. |
| 6,327,089 B1 | 12/2001 | Hosaki et al. |
| 6,330,109 B1 | 12/2001 | Ishii et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,356,674 B1 | 3/2002 | Davis et al. |
| 6,359,730 B2 | 3/2002 | Tervonen |
| 6,359,737 B1 | 3/2002 | Stringfellow |
| 6,366,281 B1 | 4/2002 | Lipton et al. |
| 6,366,369 B2 | 4/2002 | Ichikawa et al. |
| 6,366,378 B1 | 4/2002 | Tervonen et al. |
| 6,377,238 B1 | 4/2002 | McPheters |
| 6,377,321 B1 | 4/2002 | Khan et al. |
| 6,388,797 B1 | 5/2002 | Lipton et al. |
| 6,392,812 B1 | 5/2002 | Howard |
| 6,407,724 B2 | 6/2002 | Waldern et al. |
| 6,409,687 B1 | 6/2002 | Foxlin |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,470,132 B1 | 10/2002 | Nousiainen et al. |
| 6,473,209 B1 | 10/2002 | Popovich |
| 6,476,974 B1 | 11/2002 | Kreitzer et al. |
| 6,483,303 B2 | 11/2002 | Simmonds et al. |
| 6,486,997 B1 | 11/2002 | Bruzzone et al. |
| 6,504,518 B1 | 1/2003 | Kuwayama et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,522,794 B1 | 2/2003 | Bischel et al. |
| 6,522,795 B1 | 2/2003 | Jordan et al. |
| 6,524,771 B2 | 2/2003 | Maeda et al. |
| 6,529,336 B1 | 3/2003 | Kreitzer et al. |
| 6,534,977 B1 | 3/2003 | Duncan et al. |
| 6,545,778 B2 | 4/2003 | Ono et al. |
| 6,550,949 B1 | 4/2003 | Bauer et al. |
| 6,552,789 B1 | 4/2003 | Modro |
| 6,557,413 B2 | 5/2003 | Nieminen et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,014 B1 | 5/2003 | Hansen et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,583,873 B1 | 6/2003 | Goncharov et al. |
| 6,587,619 B1 | 7/2003 | Kinoshita |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,598,987 B1 | 7/2003 | Parikka |
| 6,600,590 B2 | 7/2003 | Roddy et al. |
| 6,608,720 B1 | 8/2003 | Freeman |
| 6,611,253 B1 | 8/2003 | Cohen |
| 6,618,104 B1 | 9/2003 | Date et al. |
| 6,625,381 B2 | 9/2003 | Roddy et al. |
| 6,646,772 B1 | 11/2003 | Popovich et al. |
| 6,646,810 B2 | 11/2003 | Harter, Jr. et al. |
| 6,661,578 B2 | 12/2003 | Hedrick |
| 6,667,134 B1 | 12/2003 | Sutherland et al. |
| 6,674,578 B2 | 1/2004 | Sugiyama et al. |
| 6,677,086 B1 | 1/2004 | Sutehrland et al. |
| 6,686,815 B1 | 2/2004 | Mirshekarl-Syahkal et al. |
| 6,690,516 B2 | 2/2004 | Aritake et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,721,096 B2 | 4/2004 | Bruzzone et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,741,189 B1 | 5/2004 | Gibbons, II et al. |
| 6,744,478 B1 | 6/2004 | Asakura et al. |
| 6,747,781 B2 | 6/2004 | Trisnadi et al. |
| 6,748,342 B1 | 6/2004 | Dickhaus |
| 6,750,941 B2 | 6/2004 | Satoh et al. |
| 6,750,995 B2 | 6/2004 | Dickson |
| 6,750,996 B2 | 6/2004 | Jagt et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,850,210 B1 | 2/2005 | Lipton et al. |
| 6,853,491 B1 | 2/2005 | Ruhle et al. |
| 6,853,493 B2 | 2/2005 | Kreitzer et al. |

(56) References Cited

U.S. PATENT DOCUMENTS

| | | |
|---|---|---|
| 6,864,861 B2 | 3/2005 | Schehrer et al. |
| 6,864,927 B1 | 3/2005 | Cathey |
| 6,867,888 B2 | 3/2005 | Sutherland et al. |
| 6,873,443 B1 | 3/2005 | Joubert et al. |
| 6,878,494 B2 | 4/2005 | Sutehrland et al. |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,919,003 B2 | 7/2005 | Ikeda et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,943,788 B2 | 9/2005 | Tomono |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,075 B2 | 2/2006 | Miyake et al. |
| 7,003,187 B2 | 2/2006 | Frick et al. |
| 7,006,732 B2 | 2/2006 | Gunn, III et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B2 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,376,068 B1 | 5/2008 | Khoury |
| 7,376,307 B2 | 5/2008 | Singh et al. |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,545,429 B2 | 6/2009 | Travis |

(56) References Cited

U.S. PATENT DOCUMENTS

| | | |
|---|---|---|
| 7,550,234 B2 | 6/2009 | Otaki et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,587,110 B2 | 9/2009 | Singh et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,672,549 B2 | 3/2010 | Ghosh et al. |
| 7,691,248 B2 | 4/2010 | Ikeda et al. |
| 7,710,622 B2 | 5/2010 | Takabayashi et al. |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,194,325 B2 | 6/2012 | Levola et al. |
| 8,199,803 B2 | 6/2012 | Hauske et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |

(56) References Cited

U.S. PATENT DOCUMENTS

| | | |
|---|---|---|
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,562 B2 | 7/2013 | Kopp et al. |
| 8,493,662 B2 | 7/2013 | Noui |
| 8,494,229 B2 | 7/2013 | Jarvenpaa et al. |
| 8,508,848 B2 | 8/2013 | Saarikko |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn |
| 8,933,144 B2 | 1/2015 | Enomoto et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,201,270 B2 | 12/2015 | Fattal et al. |
| 9,215,293 B2 | 12/2015 | Miller |
| 9,244,275 B1 | 1/2016 | Li |
| 9,244,280 B1 | 1/2016 | Tiana et al. |
| 9,244,281 B1 | 1/2016 | Zimmerman et al. |
| 9,269,854 B2 | 2/2016 | Jain |
| 9,274,338 B2 | 3/2016 | Robbins et al. |
| 9,274,339 B1 | 3/2016 | Brown et al. |
| 9,310,566 B2 | 4/2016 | Valera et al. |
| 9,329,325 B2 | 5/2016 | Simmonds et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,519,089 B1 | 12/2016 | Brown et al. |
| 9,519,115 B2 | 12/2016 | Yashiki et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,874 B2 | 1/2017 | Amitai |
| 9,551,880 B2 | 1/2017 | Amitai |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,671,612 B2 | 6/2017 | Kress et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |

(56) References Cited

U.S. PATENT DOCUMENTS

| | | |
|---|---|---|
| 9,804,316 B2 | 10/2017 | Drolet et al. |
| 9,804,389 B2 | 10/2017 | Popovich et al. |
| 9,823,423 B2 | 11/2017 | Waldern et al. |
| 9,874,931 B1 | 1/2018 | Koenck et al. |
| 9,933,684 B2 | 4/2018 | Brown et al. |
| 9,977,247 B1 | 5/2018 | Brown et al. |
| 10,088,686 B2 | 10/2018 | Robbins et al. |
| 10,089,516 B2 | 10/2018 | Popovich et al. |
| 10,156,681 B2 | 12/2018 | Waldern et al. |
| 10,185,154 B2 | 1/2019 | Popovich et al. |
| 10,209,517 B2 | 2/2019 | Popovich et al. |
| 10,216,061 B2 | 2/2019 | Popovich et al. |
| 10,234,696 B2 | 3/2019 | Popovich et al. |
| 10,241,330 B2 | 3/2019 | Popovich et al. |
| 10,330,777 B2 | 6/2019 | Popovich et al. |
| 10,359,736 B2 | 7/2019 | Popovich et al. |
| 10,409,144 B2 | 9/2019 | Popovich et al. |
| 10,423,813 B2 | 9/2019 | Popovich et al. |
| 10,459,311 B2 | 10/2019 | Popovich et al. |
| 10,527,797 B2 | 1/2020 | Waldern et al. |
| 10,545,346 B2 | 1/2020 | Waldern et al. |
| 10,569,449 B1 | 2/2020 | Curts et al. |
| 10,578,876 B1 | 3/2020 | Lam et al. |
| 10,598,938 B1 | 3/2020 | Huang et al. |
| 10,613,268 B1 | 4/2020 | Colburn et al. |
| 10,649,119 B2 | 5/2020 | Mohanty et al. |
| 10,678,053 B2 | 6/2020 | Waldern et al. |
| 10,690,831 B2 | 6/2020 | Calafiore |
| 10,690,916 B2 | 6/2020 | Popovich et al. |
| 10,705,281 B2 | 7/2020 | Fattal et al. |
| 10,732,351 B2 | 8/2020 | Colburn et al. |
| 10,823,887 B1 | 11/2020 | Calafiore et al. |
| 10,859,768 B2 | 12/2020 | Popovich et al. |
| 10,890,707 B2 | 1/2021 | Waldern et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,175,512 B2 | 11/2021 | Waldern et al. |
| 11,194,098 B2 | 12/2021 | Waldern et al. |
| 11,194,162 B2 | 12/2021 | Waldern et al. |
| 11,243,333 B1 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 11,448,937 B2 | 9/2022 | Brown et al. |
| 2001/0024177 A1 | 9/2001 | Popovich |
| 2001/0043163 A1 | 11/2001 | Waldern et al. |
| 2001/0046142 A1 | 11/2001 | Van Santen et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0093701 A1 | 7/2002 | Zhang et al. |
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0196332 A1 | 12/2002 | Lipton et al. |
| 2003/0007070 A1 | 1/2003 | Lipton et al. |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0149346 A1 | 8/2003 | Arnone et al. |
| 2003/0175004 A1 | 9/2003 | Garito et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0206329 A1 | 11/2003 | Ikeda et al. |
| 2003/0228019 A1 | 12/2003 | Eichler et al. |
| 2004/0004767 A1 | 1/2004 | Song |
| 2004/0012833 A1 | 1/2004 | Newswanger et al. |
| 2004/0047938 A1 | 3/2004 | Kosuga et al. |
| 2004/0057138 A1 | 3/2004 | Tanijiri et al. |
| 2004/0075830 A1 | 4/2004 | Miyake et al. |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0184156 A1 | 9/2004 | Gunn, III et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0174321 A1 | 8/2005 | Ikeda et al. |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0231774 A1 | 10/2005 | Hayashi et al. |
| 2005/0232530 A1 | 10/2005 | Kekas |
| 2005/0259217 A1 | 11/2005 | Lin et al. |
| 2005/0259302 A9 | 11/2005 | Metz et al. |
| 2005/0259944 A1 | 11/2005 | Anderson et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0002274 A1 | 1/2006 | Kihara et al. |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1 | 3/2006 | Kobayashi et al. |
| 2006/0093012 A1 | 5/2006 | Singh et al. |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0181683 A1 | 8/2006 | Bhowmik et al. |
| 2006/0191293 A1 | 8/2006 | Kuczma |
| 2006/0215244 A1 | 9/2006 | Yosha et al. |
| 2006/0215976 A1 | 9/2006 | Singh et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |

(56) References Cited

U.S. PATENT DOCUMENTS

| | | |
|---|---|---|
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0070476 A1 | 3/2007 | Yamada et al. |
| 2007/0070504 A1 | 3/2007 | Akutsu et al. |
| 2007/0089625 A1 | 4/2007 | Grinberg et al. |
| 2007/0097502 A1 | 5/2007 | Lipton et al. |
| 2007/0109401 A1 | 5/2007 | Lipton et al. |
| 2007/0116409 A1 | 5/2007 | Bryan et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0089073 A1 | 4/2008 | Hikmet |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0193085 A1 | 8/2008 | Singh et al. |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0169152 A1 | 7/2009 | Oestergard |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0065726 A1 | 3/2010 | Zhong et al. |
| 2010/0079865 A1 | 4/2010 | Saarikko et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0135615 A1 | 6/2010 | Ho et al. |
| 2010/0136319 A1 | 6/2010 | Imai et al. |
| 2010/0141555 A1 | 6/2010 | Rorberg et al. |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0202725 A1 | 8/2010 | Popovich et al. |
| 2010/0214659 A1 | 8/2010 | Levola |
| 2010/0220293 A1 | 9/2010 | Mizushima et al. |
| 2010/0225876 A1 | 9/2010 | Escuti et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2010/0322555 A1 | 12/2010 | Vermeulen et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |

(56) References Cited

U.S. PATENT DOCUMENTS

| | | |
|---|---|---|
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0221656 A1 | 9/2011 | Haddick et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0051730 A1 | 2/2013 | Travers et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0093893 A1 | 4/2013 | Schofield et al. |
| 2013/0101253 A1 | 4/2013 | Popovich et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0301014 A1 | 11/2013 | DeJong et al. |
| 2013/0305437 A1 | 11/2013 | Weller et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0009809 A1 | 1/2014 | Pyun et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1* | 5/2014 | Brown .................. G02F 1/29 385/10 |
| 2014/0146394 A1 | 5/2014 | Tout et al. |
| 2014/0152778 A1 | 6/2014 | Ihlenburg et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0255662 A1 | 9/2014 | Enomoto et al. |
| 2014/0267420 A1 | 9/2014 | Schowengerdt et al. |
| 2014/0268353 A1 | 9/2014 | Fujimura et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |

(56) References Cited

U.S. PATENT DOCUMENTS

| | | |
|---|---|---|
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0268399 A1 | 9/2015 | Futterer |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1* | 2/2016 | Valera ............... G02B 27/0081 385/36 |
| 2016/0077338 A1 | 3/2016 | Robbins et al. |
| 2016/0085300 A1 | 3/2016 | Robbins et al. |
| 2016/0097959 A1 | 4/2016 | Bruizeman et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0178901 A1 | 6/2016 | Ishikawa |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0231570 A1 | 8/2016 | Levola et al. |
| 2016/0238772 A1* | 8/2016 | Waldern ............... G02B 6/124 |
| 2016/0266398 A1 | 9/2016 | Poon et al. |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai |
| 2017/0003505 A1 | 1/2017 | Vallius et al. |
| 2017/0010466 A1 | 1/2017 | Klug et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0032166 A1 | 2/2017 | Raguin et al. |
| 2017/0034435 A1 | 2/2017 | Vallius |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0059775 A1 | 3/2017 | Coles et al. |
| 2017/0102543 A1 | 4/2017 | Vallius |
| 2017/0115487 A1 | 4/2017 | Travis et al. |
| 2017/0123208 A1 | 5/2017 | Vallius |
| 2017/0131460 A1* | 5/2017 | Lin ............... G02B 27/0172 |
| 2017/0131546 A1 | 5/2017 | Woltman et al. |
| 2017/0131551 A1 | 5/2017 | Robbins et al. |
| 2017/0160546 A1 | 6/2017 | Bull et al. |
| 2017/0180404 A1 | 6/2017 | Bersch et al. |
| 2017/0180408 A1 | 6/2017 | Yu et al. |
| 2017/0199333 A1 | 7/2017 | Waldern et al. |
| 2017/0212295 A1 | 7/2017 | Vasylyev |
| 2017/0219841 A1 | 8/2017 | Popovich et al. |
| 2017/0255257 A1 | 9/2017 | Tiana et al. |
| 2017/0276940 A1 | 9/2017 | Popovich et al. |
| 2017/0299860 A1 | 10/2017 | Wall et al. |
| 2017/0356801 A1 | 12/2017 | Popovich et al. |
| 2017/0357841 A1 | 12/2017 | Popovich et al. |
| 2018/0011324 A1 | 1/2018 | Popovich et al. |
| 2018/0059305 A1 | 3/2018 | Popovich et al. |
| 2018/0074265 A1 | 3/2018 | Waldern et al. |
| 2018/0074352 A1 | 3/2018 | Popovich et al. |
| 2018/0081190 A1 | 3/2018 | Lee et al. |
| 2018/0107011 A1 | 4/2018 | Lu et al. |
| 2018/0113303 A1 | 4/2018 | Popovich et al. |
| 2018/0120669 A1 | 5/2018 | Popovich et al. |
| 2018/0143449 A1 | 5/2018 | Popovich et al. |
| 2018/0188542 A1 | 7/2018 | Waldern et al. |
| 2018/0210198 A1 | 7/2018 | Brown et al. |
| 2018/0210396 A1 | 7/2018 | Popovich et al. |
| 2018/0232048 A1 | 8/2018 | Popovich et al. |
| 2018/0246354 A1 | 8/2018 | Popovich et al. |
| 2018/0275402 A1 | 9/2018 | Popovich et al. |
| 2018/0284440 A1 | 10/2018 | Popovich et al. |
| 2018/0373115 A1 | 12/2018 | Brown et al. |
| 2019/0042827 A1 | 2/2019 | Popovich et al. |
| 2019/0064735 A1 | 2/2019 | Waldern et al. |
| 2019/0072723 A1 | 3/2019 | Waldern et al. |
| 2019/0094548 A1 | 3/2019 | Nicholson et al. |
| 2019/0113751 A9 | 4/2019 | Waldern et al. |
| 2019/0113829 A1 | 4/2019 | Waldern et al. |
| 2019/0121027 A1 | 4/2019 | Popovich et al. |
| 2019/0129085 A1 | 5/2019 | Waldern et al. |
| 2019/0187538 A1 | 6/2019 | Popovich et al. |
| 2019/0212195 A9 | 7/2019 | Popovich et al. |
| 2019/0212588 A1 | 7/2019 | Waldern et al. |
| 2019/0212589 A1 | 7/2019 | Waldern et al. |
| 2019/0212596 A1 | 7/2019 | Waldern et al. |
| 2019/0212597 A1 | 7/2019 | Waldern et al. |
| 2019/0212698 A1 | 7/2019 | Waldern et al. |
| 2019/0212699 A1 | 7/2019 | Waldern et al. |
| 2019/0219822 A1 | 7/2019 | Popovich et al. |
| 2019/0319426 A1 | 10/2019 | Lu et al. |
| 2020/0081317 A1 | 3/2020 | Popovich et al. |
| 2020/0142131 A1 | 5/2020 | Waldern et al. |
| 2020/0159026 A1 | 5/2020 | Waldern et al. |
| 2020/0201051 A1 | 6/2020 | Popovich et al. |
| 2020/0247016 A1 | 8/2020 | Calafiore |
| 2020/0249484 A1 | 8/2020 | Waldern et al. |
| 2020/0249568 A1 | 8/2020 | Rao et al. |
| 2020/0292745 A1 | 9/2020 | Waldern et al. |
| 2020/0341194 A1 | 10/2020 | Waldern et al. |
| 2020/0348519 A1 | 11/2020 | Waldern et al. |
| 2021/0109285 A1 | 4/2021 | Jiang et al. |
| 2021/0191122 A1 | 6/2021 | Yaroshchuk et al. |
| 2021/0199873 A1 | 7/2021 | Shi et al. |
| 2021/0199971 A1 | 7/2021 | Lee et al. |
| 2021/0216040 A1 | 7/2021 | Waldern et al. |
| 2021/0231874 A1 | 7/2021 | Popovich et al. |
| 2021/0231955 A1 | 7/2021 | Waldern et al. |
| 2021/0238374 A1 | 8/2021 | Ye et al. |
| 2021/0239984 A1 | 8/2021 | Popovich et al. |
| 2021/0247560 A1 | 8/2021 | Waldern et al. |
| 2021/0247719 A1 | 8/2021 | Waldern et al. |
| 2021/0278739 A1 | 9/2021 | Brown et al. |
| 2021/0405365 A1 | 12/2021 | Popovich et al. |
| 2022/0019015 A1 | 1/2022 | Calafiore et al. |
| 2022/0082739 A1 | 3/2022 | Franke et al. |
| 2022/0091323 A1 | 3/2022 | Yaroshchuk et al. |

(56) References Cited

U.S. PATENT DOCUMENTS

| | | | |
|---|---|---|---|
| 2022/0204790 | A1 | 6/2022 | Zhang et al. |
| 2022/0206232 | A1 | 6/2022 | Zhang et al. |
| 2022/0260838 | A1 | 8/2022 | Popovich et al. |

FOREIGN PATENT DOCUMENTS

| | | |
|---|---|---|
| CN | 200944140 Y | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101793555 A | 8/2010 |
| CN | 101881936 A | 11/2010 |
| CN | 101945612 A | 1/2011 |
| CN | 102314092 A | 1/2012 |
| CN | 102498425 A | 6/2012 |
| CN | 102782563 A | 11/2012 |
| CN | 102928981 A | 2/2013 |
| CN | 103562802 A | 2/2014 |
| CN | 103777282 A | 5/2014 |
| CN | 103823267 A | 5/2014 |
| CN | 104040308 A | 9/2014 |
| CN | 104040410 A | 9/2014 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 107466372 A | 12/2017 |
| CN | 108474945 A | 8/2018 |
| CN | 108780224 A | 11/2018 |
| CN | 109154717 A | 1/2019 |
| CN | 103823267 B | 5/2019 |
| CN | 110383117 A | 10/2019 |
| CN | 107466372 B | 1/2020 |
| CN | 111684362 A | 9/2020 |
| CN | 108780224 B | 8/2021 |
| CN | 113728258 A | 11/2021 |
| CN | 113759555 A | 12/2021 |
| CN | 114721242 A | 7/2022 |
| DE | 19751190 A1 | 5/1999 |
| DE | 102006003785 A1 | 7/2007 |
| DE | 102012108424 A1 | 3/2014 |
| DE | 102013209436 A1 | 11/2014 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2748670 B1 | 11/2015 |
| EP | 2995986 A1 | 3/2016 |
| EP | 1402298 B1 | 9/2016 |
| EP | 2995986 B1 | 4/2017 |
| EP | 3256888 A1 | 12/2017 |
| EP | 3359999 A1 | 8/2018 |
| EP | 2494388 B1 | 11/2018 |
| EP | 3433658 A1 | 1/2019 |
| EP | 3433659 A1 | 1/2019 |
| EP | 3548939 A2 | 10/2019 |
| EP | 3710894 A1 | 9/2020 |
| EP | 3938821 A1 | 1/2022 |
| FR | 2677463 A1 | 12/1992 |
| GB | 2115178 A | 9/1983 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 57089722 A | 6/1982 |
| JP | 02186319 A | 7/1990 |
| JP | 03239384 A | 10/1991 |
| JP | 06294952 A | 10/1994 |
| JP | 07098439 A | 4/1995 |
| JP | 0990312 | 4/1997 |
| JP | 10096903 A | 4/1998 |
| JP | 11109320 A | 4/1999 |
| JP | 11142806 A | 5/1999 |
| JP | 2953444 B2 | 9/1999 |
| JP | 2000056259 A | 2/2000 |
| JP | 2000511306 A | 8/2000 |
| JP | 2000261706 A | 9/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002529790 A | 9/2002 |
| JP | 2002311379 A | 10/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007094175 A | 4/2007 |
| JP | 2007219106 A | 8/2007 |
| JP | 2008112187 A | 5/2008 |
| JP | 2009036955 A | 2/2009 |
| JP | 2009515225 A | 4/2009 |
| JP | 2009132221 A | 6/2009 |
| JP | 2009133999 A | 6/2009 |
| JP | 2009211091 A | 9/2009 |
| JP | 4367775 B2 | 11/2009 |
| JP | 2010044326 A | 2/2010 |
| JP | 2012137616 A | 7/2012 |
| JP | 2012533089 A | 12/2012 |
| JP | 2013061480 A | 4/2013 |
| JP | 5303928 B2 | 10/2013 |
| JP | 2013235256 A | 11/2013 |
| JP | 2014132328 A | 7/2014 |
| JP | 2015053163 A | 3/2015 |
| JP | 2015523586 A | 8/2015 |
| JP | 2015172713 A | 10/2015 |
| JP | 2016030503 A | 3/2016 |
| JP | 2018508037 A | 3/2018 |
| JP | 2018533069 A | 11/2018 |
| JP | 2019512745 A | 5/2019 |
| JP | 2019520595 A | 7/2019 |
| JP | 6598269 B2 | 10/2019 |
| JP | 6680793 B2 | 3/2020 |
| JP | 2020514783 A | 5/2020 |
| JP | 6734933 B2 | 7/2020 |
| JP | 2021509736 A | 4/2021 |
| JP | 6895451 B2 | 6/2021 |
| JP | 2022091982 A | 6/2022 |
| KR | 20060132474 A | 12/2006 |
| KR | 20100092059 A | 8/2010 |

(56) References Cited

FOREIGN PATENT DOCUMENTS

| | | |
|---|---|---|
| KR | 20140140063 A | 12/2014 |
| KR | 20140142337 A | 12/2014 |
| KR | 1020200106932 A | 9/2020 |
| KR | 20210134763 A | 11/2021 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 1999052002 A1 | 10/1999 |
| WO | 2000016136 A1 | 3/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2004102226 A2 | 11/2004 |
| WO | 2004109349 A2 | 12/2004 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2011012825 A1 | 2/2011 |
| WO | 2011032005 A2 | 3/2011 |
| WO | 2011042711 A2 | 4/2011 |
| WO | 2011042711 A3 | 4/2011 |
| WO | 2011051660 A1 | 5/2011 |
| WO | 2011055109 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013102759 A2 | 7/2013 |
| WO | 2013163347 A1 | 10/2013 |
| WO | 2013167864 A1 | 11/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016042283 A1 | 3/2016 |
| WO | 2016044193 A1 | 3/2016 |
| WO | 2016046514 A1 | 3/2016 |
| WO | 2016048729 A | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016156776 A1 | 10/2016 |
| WO | 2016181108 A1 | 11/2016 |
| WO | 2016046514 A8 | 4/2017 |
| WO | 2017060665 A1 | 4/2017 |
| WO | 2017094129 A1 | 6/2017 |
| WO | 2017162999 A1 | 9/2017 |
| WO | 2017162999 A8 | 9/2017 |
| WO | 2017178781 A1 | 10/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018102834 A3 | 6/2018 |
| WO | 2018096359 A3 | 7/2018 |
| WO | 2018129398 A1 | 7/2018 |
| WO | 2018150163 A1 | 8/2018 |
| WO | 2019046649 A1 | 3/2019 |
| WO | 2019077307 a1 | 4/2019 |

(56) References Cited

FOREIGN PATENT DOCUMENTS

| WO | 2019079350 A2 | 4/2019 |
|---|---|---|
| WO | 2019046649 A8 | 5/2019 |
| WO | 2019122806 A1 | 6/2019 |
| WO | 2019135784 A1 | 7/2019 |
| WO | 2019135796 A1 | 7/2019 |
| WO | 2019135837 A1 | 7/2019 |
| WO | 2019136470 A1 | 7/2019 |
| WO | 2019136471 A1 | 7/2019 |
| WO | 2019136473 A1 | 7/2019 |
| WO | 2019171038 A1 | 9/2019 |
| WO | 2020186113 A1 | 9/2020 |
| WO | 2020212682 A1 | 10/2020 |
| WO | 2020227236 A1 | 11/2020 |
| WO | 2021032982 A1 | 2/2021 |
| WO | 2021032983 A1 | 2/2021 |
| WO | 2021044121 A1 | 3/2021 |
| WO | 108474945 B | 10/2021 |

OTHER PUBLICATIONS

Bruzzone et al., "Compact, high-brightness LED illumination for projection systems", Journal of the SID 17/12, Dec. 2009, pp. 1043-1049.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annu. Rev. Mater. Sci., 2000, vol. 30, pp. 83-115.

Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.

Butler et al., "Diffractive Properties of Highly Birefringent Volume Gratings Investigation", Journal of Optical Society of America, Feb. 2002, vol. 19, No. 2, pp. 183-189.

Cai et al., "Recent advances in antireflective surfaces based on nanostructure arrays", Mater. Horiz., 2015, vol. 2, pp. 37-53.

Cameron, "Optical Waveguide Technology & Its Application In Head Mounted Displays", Proc. of SPIE, May 22, 2012, vol. 8383, pp. 83830E-1-83830E-11.

Cameron, "The Application of Holographic Optical Waveguide Technology to Q-Sight™ Family of Helmet Mounted Displays", Proc. of SPIE, 2009, 11 pages, vol. 7326.

Caputo et al., "POLICRYPS Composite Materials: Features and Applications", Advances in Composite Materials—Analysis of Natural and Man-Made Materials, www.intechopen.com, Sep. 2011, pp. 93-118.

Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51.

Carclo Optics, "Guide to choosing secondary optics", Carclo Optics, Dec. 15, 2014, www.carclo-optics.com, 48 pgs.

Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558.

Cheng et al., "Design of an ultra-thin near-eye display with geometrical waveguide and freeform optics", Optics Express, Aug. 2014, 16 pgs.

Chi et al., "Ultralow-refractive-index optical thin films through nanoscale etching of ordered mesoporous silica films", Optic Letters, May 1, 2012, vol. 37, No. 9, pp. 1406-1408.

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of $CO_2$ Fixed Polymer/Nematic LC Composite Films", Journal of Applied Polymer Science, Nov. 5, 2000, vol. 81, Issue 11, pp. 2744-2753.

Cho et al., "Optimization of Holographic Polymer Dispersed Liquid Crystals for Ternary Monomers", Polymer International, Nov. 1999, vol. 48, pp. 1085-1090.

Colegrove et al., "P-59: Technology of Stacking HPDLC for Higher Reflectance", SID 00 DIGEST, May 2000, pp. 770-773.

Crawford, "Electrically Switchable Bragg Gratings", Optics & Photonics News, pp. 54-59, Apr. 2003.

Cruz-Arreola et al., "Diffraction of beams by infinite or finite amplitude-phase gratings", Investigacio' N Revista Mexicana De Fl'SICA, Feb. 2011, vol. 57, No. 1, pp. 6-16.

Dabrowski, "High Birefringence Liquid Crystals", Crystals, Sep. 3, 2013, vol. 3, No. 3, pp. 443-482.

Dainty, "Some statistical properties of random speckle patterns in coherent and partially coherent illumination", Optica Acta, Mar. 12, 1970, vol. 17, No. 10, pp. 761-772.

Date, "Alignment Control in Holographic Polymer Dispersed Liquid Crystal", Journal of Photopolymer Science and Technology, Nov. 2, 2000, vol. 13, pp. 289-284.

Date et al., "52.3: Direct-viewing Display Using Alignment-controlled PDLC and Holographic PDLC", Society for Information Display Digest, May 2000, pp. 1184-1187, DOI: 10.1889/1.1832877.

Date et al., "Full-color reflective display device using holographically fabricated polymer-dispersed liquid crystal (HPDLC)", Journal of the SID, 1999, vol. 7, No. 1, pp. 17-22.

De Bitetto, "White light viewing of surface holograms by simple dispersion compensation", Applied Physics Letters, Dec. 15, 1966, vol. 9, No. 12, pp. 417-418.

Developer World, "Create customized augmented reality solutions", printed Oct. 19, 2017, LMX-001 holographic waveguide display, Sony Developer World, 3 pgs.

Dhar et al., "Recording media that exhibit high dynamic range for digital holographic data storage", Optics Letters, Apr. 1, 1999, vol. 24, No. 7, pp. 487-489.

Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.

Drake et al., "Waveguide Hologram Fingerprint Entry Device", Optical Engineering, Sep. 1996, vol. 35, No. 9, pp. 2499-2505.

Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].

Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.

Ducharme, "Microlens diffusers for efficient laser speckle generation", Optics Express, Oct. 29, 2007, vol. 15, No. 22, pp. 14573-14579.

Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.

(56) References Cited

OTHER PUBLICATIONS

Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution Tithography", Phys.Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, pp. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, pp. 1585-1588, 2003.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.

Harrold et al., "3D Display Systems Hardware Research at Sharp Laboratories of Europe: an update", Sharp Laboratories of Europe, Ltd., 7 pgs.
Harthong et al., "Speckle phase averaging in high-resolution color holography", J. Opt. Soc. Am. A, Feb. 1997, vol. 14, No. 2, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, pp. 1-25, 1997.
Hata et al., "Holographic nanoparticle-polymer composites based on step-growth thiol-ene photopolymerization", Optical Materials Express, Jun. 1, 2011, vol. 1, No. 2, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling the anisotropy of holographic polymer-dispersed Tiquid-crystal gratings", Physical Review E, Jun. 11, 2002, vol. 65, 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed Tiquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Irie, "Photochromic diarylethenes for photonic devices", Pure and Applied Chemistry, 1996, pp. 1367-1371, vol. 68, No. 7, IUPAC.
Jeng et al., "Aligning liquid crystal molecules", SPIE, 2012, 10.1117/2.1201203.004148, 2 pgs.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Reporton Large Area Display", Kahn International, Jan. 7, 2003, vol. 8, No. 10, 9 pgs.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol.

(56) References Cited

OTHER PUBLICATIONS 7407, 2009 SPIE, CCC code: 0277-786X/09, doi: 10.1117/12. 826531, pp. 74070D-1-74070D-11.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE,1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 DIGEST, 2004, ISSN/0004-0966X/04/3502, pp. 943-945.
Keuper et al., "P-126: Ultra-Compact LED based Image Projector for Portable Applications", SID 03 DIGEST, 2003, ISSN/0003-0966X/03/3401-0713, pp. 713-715.
Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, pp. 3855-3864, 2001.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, pp. 2909-2945, Nov. 1969.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session Wearable Systems for Industrial Augmented Reality Applications, pp. 1479-1482.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Levola et al., "Replicated slanted gratings with a high refractive index material for in and outcoupling of light", Optics Express, vol. 15, Issue 5, pp. 2067-2074 (2007).
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE El 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lin et al., "Ionic Liquids in Photopolymerizable Holographic Materials", in book Holograms—Recording Materials and Applications, Nov. 9, 2011, 21 pgs.
Liu et al., "Holographic Polymer-Dispersed Liquid Crystals: Materials, Formation, and Applications", Advances in OptoElectronics, Nov. 30, 2008, vol. 2008, Article ID 684349, 52 pgs.
Extended European Search Report for European Application No. 18727645.6, Search completed Oct. 14, 2020, dated Oct. 23, 2020, 13 Pgs.
International Preliminary Report on Patentability for International Application No. PCT/US2019/012758, Report dated Jul. 14, 2020, dated Jul. 23, 2020, 4 Pgs.
International Preliminary Report on Patentability for International Application No. PCT/US2019/012759, Report dated Jul. 14, 2020, dated Jul. 23, 2020, 6 Pgs.
International Preliminary Report on Patentability for International Application PCT/US2019/012764, Report dated Jul. 14, 2020, dated Jul. 23, 2020, 5 Pgs.
International Search Report and Written Opinion for International Application No. PCT/US2020/022482, Search completed May 12, 2020, dated Jun. 9, 2020, 11 Pgs.
International Search Report and Written Opinion for International Application No. PCT/US2020/031363, completed May 28, 2020, dated Jun. 10, 2020, 8 Pgs.
Supplementary Partial European Search Report for European Application No. 18727645.6, Search completed Jul. 2, 2020, dated Jul. 13, 2020, 13 Pgs.
Fuh et al., "Thermally and Electrically Switchable Gratings Based Upon the Polymer-Balls Type Polymer-Dispersed Liquid Crystal Films", Appl. Phys. vol. 41, No. 22, Aug. 1, 2002, pp. 4585-4589.
Jeong et al., "Memory Effect of Polymer Dispersed Liquid Crystal by Hybridization with Nanoclay", express Polymer Letters, vol. 4, No. 1, 2010, pp. 39-46.
International Search Report and Written Opinion for International Application No. PCT/US2019/031163, completed Jul. 9, 2019, dated Jul. 29, 2019, 11 pgs.
International Search Report and Written Opinion for International Application No. PCT/GB2010/000835, completed Oct. 26, 2010, dated Nov. 8, 2010, 12 pgs.
International Search Report and Written Opinion for International Application No. PCT/GB2010/001920, completed Mar. 29, 2011, dated Apr. 6, 2011, 15 pgs.
International Search Report and Written Opinion for International Application No. PCT/GB2015/000228, completed May 4, 2011, dated Jul. 15, 2011, 15 pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/GB2017/000055, completed Jul. 19, 2017, dated Jul. 26, 2017, 12 pgs.
International Search Report and Written Opinion for International Application No. PCT/US2013/038070, completed Aug. 12, 2013, dated Aug. 14, 2013, 12 pgs.
International Search Report and Written Opinion for International Application No. PCT/US2014/011736, completed Apr. 18, 2014, dated May 8, 2014, 10 pgs.
International Search Report and Written Opinion for International Application No. PCT/US2018/012691, completed Mar. 10, 2018, dated Mar. 28, 2018, 16 pgs.
International Search Report and Written Opinion for International Application No. PCT/US2018/015553, completed Aug. 6, 2018, dated Sep. 19, 2018, 12 pgs.
International Search Report and Written Opinion for International Application No. PCT/US2018/037410, Search completed Aug. 16, 2018, dated Aug. 30, 2018, 11 pgs.
International Search Report and Written Opinion for International Application No. PCT/US2018/048636, completed Nov. 1, 2018, dated Nov. 15, 2018, 16 pgs.

(56) References Cited

OTHER PUBLICATIONS

International Search Report and Written Opinion for International Application No. PCT/US2018/056150, completed Dec. 4, 2018, dated Dec. 26, 2018, 10 pgs.
International Search Report and Written Opinion for International Application No. PCT/US2018/062835, Search completed Jan. 14, 2019, dated Jan. 31, 2019, 14 pgs.
International Search Report and Written Opinion for International Application No. PCT/US2019/012758, completed Mar. 12, 2019, dated Mar. 27, 2019, 9 pgs.
International Search Report and Written Opinion for International Application No. PCT/US2019/012764, completed Mar. 1, 2019, dated Mar. 18, 2019, 9 pgs.
International Search Report and Written Opinion for International Application No. PCT/US2018/048960, Search completed Dec. 14, 2018, dated Jan. 8, 2019, 14 pgs.
International Search Report and Written Opinion for International Application PCT/GB2009/051676, completed May 10, 2010, dated May 18, 2010, 7 pgs.
International Search Report and Written Opinion for International Application PCT/GB2016/000181, completed Dec. 21, 2016, dated Feb. 27, 2017, 21 pgs.
International Search Report and Written Opinion for International Application PCT/US2016/017091, completed by the European Patent Office on Apr. 20, 2016, 7 pgs.
International Search Report and Written Opinion for International Application PCT/US2019/012759, completed Mar. 14, dated Apr. 15, 2019, 12 pgs.
International Search Report for International Application No. PCT/GB2014/000295, completed Nov. 18, 2014, dated Jan. 5, 2015, 4 pgs.
International Search Report for International Application PCT/GB2017/000040, dated Jul. 18, 2017, completed Jul. 10, 2017, 3 pgs.
International Search Report for PCT/GB2010/001982, completed by the European Patent Office on Feb. 24, 2011, 4 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000273, completed by the European Patent Office on Aug. 30, 2013, 4 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, dated Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office dated Jun. 27, 2016, 4 pgs.
International Search Report for PCT/GB2016/000051, Completed Aug. 11, 2016, 3 Pgs.
Written Opinion for International Application No. PCT/GB2010/001982, search completed Feb. 24, 2011, dated Mar. 8, 2011, 6 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2013/000273, completed Aug. 30, 2013, dated Sep. 9, 2013, 7 pgs.
Written Opinion for International Application No. PCT/GB2014/000295, search completed Nov. 18, 2014, dated Jan. 5, 2015, 3 pgs.
Written Opinion for International Application No. PCT/GB2015/000203, completed Oct. 29, 2015, dated Nov. 16, 2015, 7 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2016/000051, Search completed Aug. 11, 2016, dated Aug. 22, 2016, 6 Pgs.
Written Opinion for International Application No. PCT/GB2017/000040, search completed Jul. 10, 2017, dated Jul. 18, 2017, 6 pgs.
Written Opinion for International Application PCT/GB2016/000003, completed May 31, 2016, dated Aug. 12, 2016, 10 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer Materialscience AG, Mar. 18, 2013, www.bayercoatings.com, 4 pgs.
Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, Feb. 1, 2004, vol. 95, No. 3, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.

(56) References Cited

OTHER PUBLICATIONS

McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Moffitt, "Head-Mounted Display Image Configurations", retrieved from the internet on Dec. 19, 2014, dated May 2008, 25 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Nordin G et al., "Diffraction Properties of Stratified Volume Holographic Optical Elements", Journal of the Optical Society of America A., vol. 9, No. 12, Dec. 1992, pp. 2206-2217.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Sagan et al., "Electrically Switchable Bragg Grating Technology for Projection Displays", Proc. SPIE. vol. 4294, Jan. 24, 2001, pp. 75-83.
Saleh et al., "Fourier Optics : 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schechter et al., "Compact beam expander with linear gratings", Applied Optics, vol. 41, No. 7, Mar. 1, 2002, pp. 1236-1240.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Extended European Search Report for EP Application No. 13192383, dated Apr. 2, 2014, 7 pgs.
Extended European Search Report for European Application No. 13765610.4 dated Feb. 16, 2016, 6 pages.
Extended European Search Report for European Application No. 15187491.4, search completed Jan. 15, 2016, dated Jan. 28, 2016, 5 pgs.

(56) References Cited

OTHER PUBLICATIONS

International Preliminary Report on Patentability for International Application No. PCT/GB2010/000835, dated Nov. 1, 2011, dated Nov. 10, 2011, 9 pgs.
International Preliminary Report on Patentability for International Application No. PCT/GB2010/001920, dated Apr. 11, 2012, dated Apr. 19, 2012, 10 pgs.
International Preliminary Report on Patentability for International Application No. PCT/GB2010/001982, report dated May 1, 2012, dated May 10, 2012, 7 pgs.
International Preliminary Report on Patentability for International Application No. PCT/GB2013/000273, dated Dec. 23, 2014, dated Dec. 31, 2014, 8 pgs.
International Preliminary Report on Patentability for International Application No. PCT/GB2015/000203, dated Mar. 21, 2017, dated Mar. 30, 2017, 8 pgs.
International Preliminary Report on Patentability for International Application No. PCT/GB2016/000036, dated Aug. 29, 2017, dated Sep. 8, 2017, 8 pgs.
International Preliminary Report on Patentability for International Application No. PCT/GB2016/000051, Report dated Sep. 19, 2017, dated Sep. 28, 2017, 7 pgs.
International Preliminary Report on Patentability for International Application No. PCT/GB2016/000065, dated Oct. 3, 2017, dated Oct. 12, 2017, 8 pgs.
International Preliminary Report on Patentability for International Application PCT/US2018/015553, dated Jun. 4, 2019, dated Jun. 13, 2019, 6 pgs.
International Preliminary Report on Patentability for International Application PCT/GB2009/051676, dated Jun. 14, 2011, dated Jun. 23, 2011, 6 pgs.
International Preliminary Report on Patentability for International Application PCT/GB2011/000349, dated Sep. 18, 2012, dated Sep. 27, 2012, 10 pgs.
International Preliminary Report on Patentability for International Application PCT/GB2012/000331, dated Oct. 8, 2013, dated Oct. 17, 2013, 8 pgs.
International Preliminary Report on Patentability for International Application PCT/GB2012/000677, dated Feb. 25, 2014, dated Mar. 6, 2014, 5 pgs.
International Preliminary Report on Patentability for International Application PCT/GB2013/000005, dated Jul. 8, 2014, dated Jul. 17, 2014, 12 pgs.
International Preliminary Report on Patentability for International Application PCT/GB2014/000295, dated Feb. 2, 2016, dated Feb. 11, 2016, 4 pgs.
International Preliminary Report on Patentability for International Application PCT/GB2015/000225, dated Feb. 14, 2017, dated Feb. 23, 2017, 8 pgs.
International Preliminary Report on Patentability for International Application PCT/GB2015/000228, dated Feb. 14, 2017, dated Feb. 23, 2017, 11 pgs.
International Preliminary Report on Patentability for International application PCT/GB2015/000274, dated Mar. 28, 2017, dated Apr. 6, 2017, 8 pgs.
International Preliminary Report on Patentability for International Application PCT/GB2016/000014, dated Jul. 25, 2017, dated Aug. 3, 2017, 7 pgs.
International Preliminary Report on Patentability for International Application PCT/GB2017/000055, dated Oct. 16, 2018, dated Oct. 25, 2018, 9 pgs.
International Preliminary Report on Patentability for International Application PCT/US2014/011736, dated Jul. 21, 2015, dated Jul. 30, 2015, 9 pgs.
International Preliminary Report on Patentability for International Application PCT/US2016/017091, dated Aug. 15, 2017, dated Aug. 24, 2017, 5 pgs.
International Preliminary Report on Patentability for International Application PCT/US2018/012691, Report dated Jul. 9, 2019, dated Jul. 18, 2019, 10 pgs.
International Preliminary Report on Patentability for International Application PCT/GB2017/000040, Report dated Sep. 25, 2018, dated Oct. 4, 2018, 7 pgs.
International Preliminary Report on Patentability for PCT Application No. PCT/US2013/038070, dated Oct. 28, 2014, 6 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Navy awards SGB Labs a contract for HMDs for simulation and training", Press releases, DigiLens, Oct. 2012, pp. 1-2.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Plastic has replaced glass in photochromic lens", 2003, 1 page.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"USAF Awards SBG Labs an SBIR Contract for Wide Field of View HUD", Press Release, SBG Labs DigiLens, Apr. 2014, 2 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.

(56) References Cited

OTHER PUBLICATIONS

"VerLASE Gets Patent for Breakthrough Color Conversion Technology That Enables Full Color MicroLED Arrays for Near Eye Displays", Cision PRweb, Apr. 8, 2015, Retrieved from the Internet http://www.prweb.com/releases/2015/04/prweb12681038.htm, 3 pgs.
"Webster's Third New International Dictionary 433", (1986), 3 pages.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amitai et al., "Visor-display design based on planar holographic optics", Applied Optics, vol. 34, No. 8, Mar. 10, 1995, pp. 1352-1356.
Amundson et al., "Morphology and electro-optic properties of polymer-dispersed liquid-crystal films", Physical Review E, Feb. 1997, vol. 55, No. 2, pp. 1646-1654.
An et al., "Speckle suppression in laser display using several partially coherent beams", Optics Express, Jan. 5, 2009, vol. 17, No. 1, pp. 92-103.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the SID, May 18, 2009, 17/8, pp. 659-664.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631.
Bleha et al., "Binocular Holographic Waveguide Visor Display", SID Symposium Digest of Technical Papers, Holoeye Systems Inc., Jun. 2014, San Diego, CA, 4 pgs.
Bleha et al., "D-ILA Technology For High Resolution Projection Displays", Sep. 10, 2003, Proceedings, vol. 5080, doi: 10.1117/12.497532, 11 pgs.
Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Bowley et al., "Variable-wavelength switchable Bragg gratings formed in polymer-dispersed liquid crystals", Applied Physics Letters, Jul. 2, 2001, vol. 79, No. 1, pp. 9-11.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.
International Preliminary Report on Patentability for International Application No. PCT/US2018/012227, Report dated Jul. 30, 2019, dated Aug. 8, 2019, 7 pgs.
International Preliminary Report on Patentability for International Application PCT/US2018/048960, Report dated Mar. 3, 2020, dated Mar. 12, 2020, 7 pgs.
International Search Report and Written Opinion for International Application No. PCT/US2018/012227, Search completed Feb. 28, 2018, dated Mar. 14, 2018, 8 pgs.
Yang et al., "Robust and Accurate Surface Measurement Using Structured Light", IEEE, Apr. 30, 2008, vol. 57, Issue 6, pp. 1275-1280.
Smith et al., "RM-PLUS—Overview", Licrivue, Novembers, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "$TiO_2$ nanocomposites with high refractive index and transparency", J. Mater. Chem., Oct. 4, 2011, vol. 21, p. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.

(56) References Cited

OTHER PUBLICATIONS

Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Urey, "Diffractive exit pupil expander for display applications", Applied Optics, vol. 40, Issue 32, pp. 5840-5851 (2001).
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR DI Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wight et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, p. 12874-12883.
Wisely, "Head up and head mounted display performance improvements through advanced techniques in the manipulation of light", Proc, of SPIE, 2009, 10 pages, vol. 7327.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zlębacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
Extended European Search Report for European Application No. 19736108.2, Search completed Sep. 15, 2021, dated Sep. 27, 2021, 8 Pgs.
International Preliminary Report on Patentability for International Application PCT/US2020/022482, dated Aug. 25, 2021, dated Sep. 23, 2021, 7 Pgs.
International Preliminary Report on Patentability for International Application PCT/US2020/031363, dated Nov. 2, 2021, dated Nov. 18, 2021, 7 Pgs.

* cited by examiner

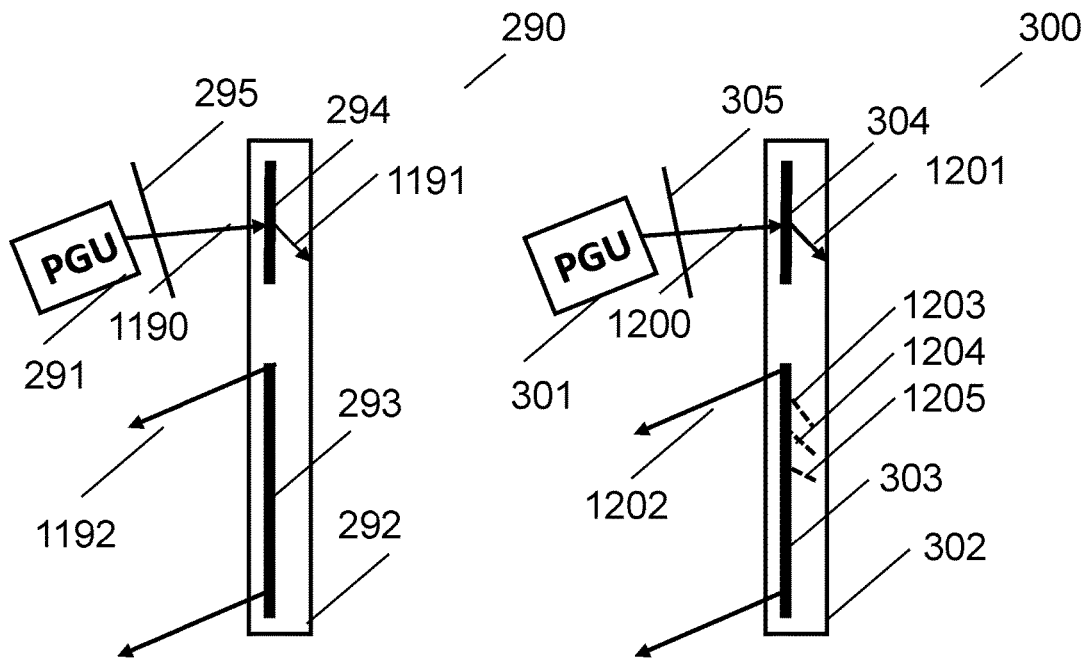
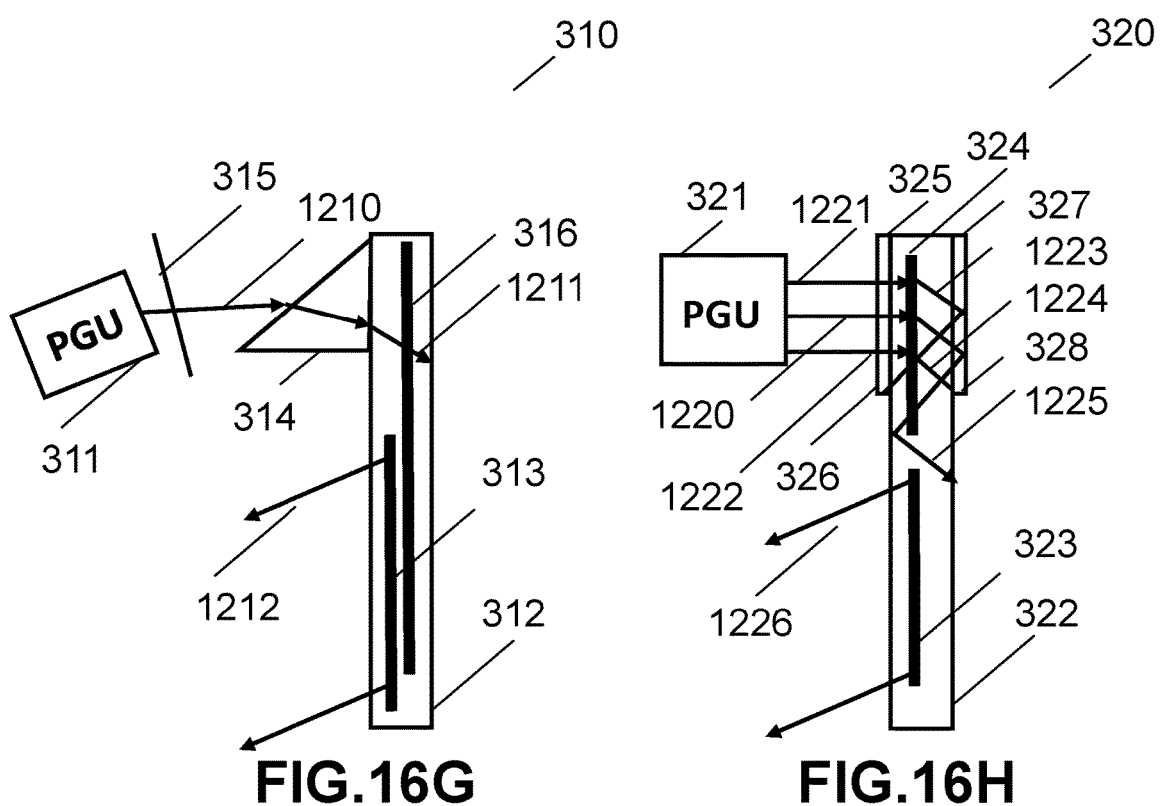

WAVEGUIDE DEVICE WITH UNIFORM OUTPUT ILLUMINATION

CROSS REFERENCE TO RELATED APPLICATIONS

This application is a national stage of PCT Patent Application No. PCT/US2018/015553, entitled "Waveguide Device with Uniform Output Illumination" to Waldern et al., filed Jan. 26, 2018, which claims priority to U.S. Provisional Application No. 62/499,423, entitled "Waveguide Device with Uniform Output Illumination" to Waldern et al., filed Jan. 26, 2017, and claims priority to U.S. Provisional Application No. 62/497,781, entitled "Apparatus for Homogenizing the Output from a Waveguide Device" to Waldern et al., filed Dec. 2, 2016, the disclosures of which are incorporated by reference herein in their entireties.

FIELD OF THE INVENTION

The present disclosure relates to waveguide devices and more particularly to waveguides having uniform output illumination.

BACKGROUND OF THE INVENTION

Waveguide optics are currently being considered for a range of display and sensor applications for which the ability of waveguide devices to integrate multiple optical functions into a thin, transparent, lightweight substrate is of key importance. This new approach is stimulating new product developments including near-eye displays for Augmented Reality (AR) and Virtual Reality (VR), compact Heads Up Display (HUDs) for aviation and road transport and sensors for biometric and laser radar (LIDAR) applications.

Waveguide devices offer many features that are attractive in HMDs and HUDs. They are thin and transparent. Wide fields of views can be obtained by recording multiple holograms and tiling the field of view regions formed by each hologram.

BRIEF SUMMARY OF THE INVENTION

Several embodiments are directed to a waveguide device that includes at least one optical substrate, at least one light source; at least one light coupler, at least one light extractor, a debanding optic. The at least one light coupler is capable of coupling incident light from the light source with an angular bandwidth into a total internal reflection (TIR) within the at least one optical substrate such that a unique TIR angle is defined by each light incidence angle as determined at the input grating. The at least one light extractor extracts the light from the optical substrate. The debanding optic is capable of mitigating banding effects of an illuminated pupil, such that the extracted light is a substantially flat illumination profile having mitigated banding.

In more embodiments, the extracted light has a spatial non-uniformity less than 10%.

In further embodiments, the extracted light has a spatial non-uniformity less than 20%.

In further more embodiments, the debanding optic is an effective input aperture such that when the optical substrate has a thickness D, the input aperture is configured to provide a TIR angle U in the optical substrate, and the angle U is calculated by 2D tan (U).

In even more embodiments, the debanding optic provides spatial variation of the light along the TIR path of at least one of diffraction efficiency, optical transmission, polarization or birefringence.

In even further embodiments, the debanding optic is at least one grating selected from at least one input grating and at least one output grating. The selected at least one grating is configured to have multiple gratings, such that each grating provides a small pupil shift to mitigate banding.

In even further more embodiments, the debanding optic is at least one grating selected from at least one input grating and at least one output grating. The selected at least one grating is configured as a stacked switchable grating that turns on when a voltage is applied, shifting pupil to mitigate banding effects.

In even further more embodiments, the debanding optic is at least one grating selected from at least one input grating and at least one output grating. The selected at least one grating is configured as an array of switchable grating elements that can turn on a specific element when a voltage is applied, shifting pupil to mitigate banding effects In even further more embodiments, the selected at least one grating has a plurality of rolled K-vectors.

In even further more embodiments, the debanding optic is at least one grating selected from at least one input grating and at least one output grating. The selected at least one grating is configured to be a plurality of passive grating layers configured to shift pupil to mitigate banding effects.

In even further more embodiments, the debanding optic is one or more index layers disposed within the optical substrate such that the one or more index layers influences the light ray paths within the optical substrate as a function of at least one of ray angle or ray position, shifting pupil to mitigate banding effects.

In even further more embodiments, at least one index layer of the one or more index layers is a gradient index (GRIN) medium.

In even further more embodiments, the waveguide device further includes at least one reflecting surface on at least a part of an edge of the optical substrate. The debanding optic is one or more index layers disposed adjacent to the at least one reflecting surface such that the one or more index layers are configured to shift pupil to mitigate banding effects.

In even further more embodiments, the debanding optic is one or more index layers disposed within the optical substrate such that the one or more index layers are configured to shift pupil to mitigate banding effects.

In even further more embodiments, the debanding optic is an input grating having a leading edge able to couple the incident light such that a unique displacement of a ray bundle of the light relative to the leading edge of the input grating is provided by the input grating for any given incident light direction, shifting pupil to mitigate banding effects.

In even further more embodiments, the debanding optic is an input grating configured to have a variation of diffraction efficiencies such that a plurality of collimated incident ray paths of the incident light is diffracted into different TIR ray paths, as determined by a ray path input angle, such that a projected pupil is capable of forming at a unique location within the optical substrate for each of the plurality of collimated incident ray paths to mitigate banding effects.

In even further more embodiments, the variation of diffraction efficiencies varies along a principal waveguide direction.

In even further more embodiments, the variation of diffraction efficiencies varies in two dimensions over the aperture of the input grating.

In even further more embodiments, the debanding optic is a partially reflecting layer disposed within the optical substrate such that the partially reflecting layer separates incident light into transmitted and reflected light, shifting pupil to mitigate banding effects.

In even further more embodiments, the debanding optic is a polarization modifying layer disposed within the optical substrate such that the polarization modifying layer separates incident light into transmitted and reflected light, shifting pupil to mitigate banding effects.

In even further more embodiments, the debanding optic is at least one grating selected from at least one input grating and at least one output grating. The selected at least one grating is configured to provide at least two separate waveguide paths which cancel non-uniformity of light of the extracted light for any incidence light angle, mitigating banding effects.

In even further more embodiments, the selected grating has crossed slant gratings used in conjunction with at least one fold grating exit pupil expander.

In even further more embodiments, the debanding optic is an optical component within a microdisplay that provides variable effective numerical apertures (NA) capable of being spatially varied along at least one direction to shift pupil shift to mitigate banding effects.

In even further more embodiments, the debanding optic is a plurality of grating layers within at least one grating of either at least one input grating or at least one output grating such that the plurality of grating layers is configured to smear out any fixed pattern noise resulting in shift of pupil to mitigate banding effects.

In even further more embodiments, the debanding optic is an input grating configured as an array of selectively switchable elements such that configuring the input grating as a switching grating array provides pupil switching in vertical and horizontal directions to shift pupil to mitigate banding effects.

In even further more embodiments, the debanding optic is a plurality of refractive index layers that provide spatial variation along each TIR path of at least one of diffraction efficiency, optical transmission, polarization and birefringence to influence ray paths within a waveguide substrate as a function of at least one of ray angle or ray position within the substrate, resulting in shift of pupil to mitigate banding effects.

In even further more embodiments, the plurality of refractive index layers incorporates adhesives of different indices.

In even further more embodiments, the plurality of refractive index layers incorporates layers selected from the group consisting of alignment layers, isotropic refractive layers, GRIN structures, antireflection layers, partially reflecting layer, and birefringent stretched polymer layers.

In even further more embodiments, the debanding optic is a microdisplay projecting spatially varied numerical apertures that shift pupil to mitigate banding effects.

In even further more embodiments, the debanding optic is a tilted microdisplay configured to project a tilted, rectangular exit pupil such that the cross section of the exit pupil varies with a field angle, such that banding effects are mitigated.

In even further more embodiments, the debanding optic is a tilted microdisplay configured to angle light rays to form various projected pupils at different positions along the optical substrate for each angle of incident light, such that banding effects are mitigated along one expansion axis.

In even further more embodiments, the optical substrate has a thickness D and the debanding optic is a prism coupled to the optical substrate, such that a linear relationship between the angles of an exit pupil from the light source and the TIR angles in the optical substrate result in no gaps between successive light extractions along the TIR ray path, which occurs when the TIR path angle is U as defined by 2D tan (U).

In even further more embodiments, the debanding optic is a light-absorbing film adjacent to the edges of the optical substrate such that portions of the incident light, that would otherwise give rise to banding, are removed, mitigating banding effects.

In even further more embodiments, the optical substrate has a thickness D and the debanding optic is a first light-absorbing film disposed adjacent to the edges an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path, which occurs when the TIR path angle is U as defined by 2D tan (U).

In even further more embodiments, the thickness of the optical substrate is 3.4 mm, the thickness of the second is substrate 0.5 mm, and the input substrate contains two 0.5 mm thick glass substrates sandwiching the input grating.

In even further more embodiments, the debanding optic is an input grating configured such that the light has a unique displacement relative to an edge of the input grating at any given incident light direction to shift pupil, eliminating or mitigating a banding effect.

In even further more embodiments, the device is integrated into a display selected from the group of head mounted display (HMD) and a head up display (HUD).

In even further more embodiments, a human eye is positioned with an exit pupil of the display.

In even further more embodiments, the device incorporates an eye tracker.

In even further more embodiments, the waveguide device further includes an input image generator that further includes the light source, a microdisplay panel, and optics for collimating the light.

In even further more embodiments, the light source is at least one laser.

In even further more embodiments, the light source is at least one light emitting diode (LED).

In even further more embodiments, the light coupler is an input grating.

In even further more embodiments, the light coupler is a prism.

In even further more embodiments, the light extractor is an input grating.

Several embodiments are directed to a color waveguide device that includes at least two optical substrates, at least one light source, at least one light coupler, at least one light extractor, and at least two input stops. The at least two optical substrates are stacked upon each other. The at least one light coupler is capable of coupling incident light from the light source with an angular bandwidth into a total internal reflection (TIR) within the at least one optical substrate such that a unique TIR angle is defined by each light incidence angle as determined at the input grating. The at least one light extractor extracts the light from the optical substrate. The at least two input stops are each within a different optical substrate, each in a different plane, and each input stop includes an outer dichroic portion to shift pupil and mitigate color banding.

In more embodiments, each input stop also includes an inner phase compensation coating to compensate for a phase shift.

In further embodiments, the compensation coating includes $SiO_2$.

Several embodiments are directed to a method to mitigate banding in an output illumination of a waveguide device. The method produces incident light from a light source. The method passes the incident light through a light coupler to couple the incident light into an optical substrate such that the coupled light undergoes total internal reflection (TIR) within the optical substrate. The method also extracts the TIR light from the optical substrate via a light extractor to produce the output illumination. The light passes through a debanding optic of the waveguide device such that the debanding optic mitigates a banding effect of the output illumination.

In more embodiments, the output illumination has a spatial non-uniformity less than 10%.

In further embodiments, the output illumination has a spatial non-uniformity less than 20%.

In further more embodiments, the debanding optic is an effective input aperture such that when the optical substrate has a thickness D, the input aperture is configured to provide a TIR angle U in the optical substrate, and the angle U is calculated by 2D tan (U).

In even more embodiments, the debanding optic provides spatial variation of the light along the TIR path of at least one of diffraction efficiency, optical transmission, polarization or birefringence.

In even further embodiments, the debanding optic is at least one grating selected from at least one input grating and at least one output grating. The selected at least one grating is configured to have multiple gratings, such that each grating provides a small pupil shift to mitigate banding.

In even further more embodiments, the debanding optic is at least one grating selected from at least one input grating and at least one output grating. The selected at least one grating is configured as a stacked switchable grating that turns on when a voltage is applied, shifting pupil to mitigate banding effects.

In even further more embodiments, the debanding optic is at least one grating selected from at least one input grating and at least one output grating. The selected at least one grating is configured as an array of switchable grating elements that can turn on a specific element when a voltage is applied, shifting pupil to mitigate banding effects In even further more embodiments, the selected at least one grating has a plurality of rolled K-vectors.

In even further more embodiments, the debanding optic is at least one grating selected from at least one input grating and at least one output grating. The selected at least one grating is configured to be a plurality of passive grating layers configured to shift pupil to mitigate banding effects.

In even further more embodiments, the debanding optic is one or more index layers disposed within the optical substrate such that the one or more index layers influences the light ray paths within the optical substrate as a function of at least one of ray angle or ray position, shifting pupil to mitigate banding effects.

In even further more embodiments, at least one index layer of the one or more index layers is a gradient index (GRIN) medium.

In even further more embodiments, the waveguide device further includes at least one reflecting surface on at least a part of an edge of the optical substrate. The debanding optic is one or more index layers disposed adjacent to the at least one reflecting surface such that the one or more index layers are configured to shift pupil to mitigate banding effects.

In even further more embodiments, the debanding optic is one or more index layers disposed within the optical substrate such that the one or more index layers are configured to shift pupil to mitigate banding effects.

In even further more embodiments, the debanding optic is an input grating having a leading edge able to couple the incident light such that a unique displacement of a ray bundle of the light relative to the leading edge of the input grating is provided by the input grating for any given incident light direction, shifting pupil to mitigate banding effects.

In even further more embodiments, the debanding optic is an input grating configured to have a variation of diffraction efficiencies such that a plurality of collimated incident ray paths of the incident light is diffracted into different TIR ray paths, as determined by a ray path input angle, such that a projected pupil is capable of forming at a unique location within the optical substrate for each of the plurality of collimated incident ray paths to mitigate banding effects.

In even further more embodiments, the variation of diffraction efficiencies varies along a principal waveguide direction.

In even further more embodiments, the variation of diffraction efficiencies varies in two dimensions over the aperture of the input grating.

In even further more embodiments, the debanding optic is a partially reflecting layer disposed within the optical substrate such that the partially reflecting layer separates incident light into transmitted and reflected light, shifting pupil to mitigate banding effects.

In even further more embodiments, the debanding optic is a polarization modifying layer disposed within the optical substrate such that the polarization modifying layer separates incident light into transmitted and reflected light, shifting pupil to mitigate banding effects.

In even further more embodiments, the debanding optic is at least one grating selected from at least one input grating and at least one output grating, and wherein the selected at least one grating is configured to provide at least two separate waveguide paths which cancel non-uniformity of light of the extracted light for any incidence light angle, mitigating banding effects.

In even further more embodiments, the selected grating has crossed slant gratings used in conjunction with at least one fold grating exit pupil expander.

In even further more embodiments, the debanding optic is an optical component within a microdisplay that provides variable effective numerical apertures (NA) capable of being spatially varied along at least one direction to shift pupil shift to mitigate banding effects.

In even further more embodiments, the debanding optic is a plurality of grating layers within at least one grating of either at least one input grating or at least one output grating such that the plurality of grating layers is configured to smear out any fixed pattern noise resulting in shift of pupil to mitigate banding effects.

In even further more embodiments, the debanding optic is an input grating configured as an array of selectively switchable elements such that configuring the input grating as a switching grating array provides pupil switching in vertical and horizontal directions to shift pupil to mitigate banding effects.

In even further more embodiments, the debanding optic is a plurality of refractive index layers that provide spatial variation along each TIR path of at least one of diffraction efficiency, optical transmission, polarization and birefringence to influence ray paths within a waveguide substrate as a function of at least one of ray angle or ray position within the substrate, resulting in shift of pupil to mitigate banding effects.

In even further more embodiments, the plurality of refractive index layers incorporates adhesives of different indices.

In even further more embodiments, the plurality of refractive index layers incorporate layers selected from the group consisting of alignment layers, isotropic refractive layers, GRIN structures, antireflection layers, partially reflecting layer, and birefringent stretched polymer layers.

In even further more embodiments, the debanding optic is a microdisplay projecting spatially varied numerical apertures that shift pupil to mitigate banding effects.

In even further more embodiments, the debanding optic is a tilted microdisplay configured to project a tilted, rectangular exit pupil such that the cross section of the exit pupil varies with a field angle, such that banding effects are mitigated.

In even further more embodiments, the debanding optic is a tilted microdisplay configured to angle light rays to form various projected pupils at different positions along the optical substrate for each angle of incident light, such that banding effects are mitigated along one expansion axis.

In even further more embodiments, the optical substrate has a thickness D and the debanding optic is a prism coupled to the optical substrate, such that a linear relationship between the angles of an exit pupil from the light source and the TIR angles in the optical substrate result in no gaps between successive light extractions along the TIR ray path, which occurs when the TIR path angle is U as defined by 2D tan (U).

In even further more embodiments, the debanding optic is a light-absorbing film adjacent to the edges of the optical substrate such that portions of the incident light, that would otherwise give rise to banding, are removed, mitigating banding effects.

In even further more embodiments, the optical substrate has a thickness D and the debanding optic is a first light-absorbing film disposed adjacent to the edges of an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path, which occurs when the TIR path angle is U as defined by 2D tan (U).

In even further more embodiments, the thickness of the optical substrate is 3.4 mm, the thickness of the second is substrate 0.5 mm, and the input substrate contains two 0.5 mm thick glass substrates sandwiching the input grating.

In even further more embodiments, the debanding optic is an input grating configured such that the light has a unique displacement relative to an edge of the input grating at any given incident light direction to shift pupil, eliminating or mitigating a banding effect.

In even further more embodiments, the method is performed by a display selected from the group of head mounted display (HMD) and a head up display (HUD).

In even further more embodiments, a human eye is positioned with an exit pupil of the display.

In even further more embodiments, the display incorporates an eye tracker.

In even further more embodiments, the waveguide device further includes an input image generator that further comprises the light source, a microdisplay panel, and optics for collimating the light.

In even further more embodiments, the light source is at least one laser.

In even further more embodiments, the light source is at least one light emitting diode (LED).

In even further more embodiments, the light coupler is an input grating.

In even further more embodiments, the light coupler is a prism.

In even further more embodiments, the light extractor is an input grating.

INCORPORATION BY REFERENCE

The following related issued patents and patent applications are incorporated by reference herein in their entireties: U.S. Pat. No. 9,075,184 entitled COMPACT EDGE ILLUMINATED DIFFRACTIVE DISPLAY; U.S. Pat. No. 8,233,204 entitled OPTICAL DISPLAYS; PCT Application No. US2006/043938 entitled METHOD AND APPARATUS FOR PROVIDING A TRANSPARENT DISPLAY; PCT Application No. GB2012/000677 entitled WEARABLE DATA DISPLAY; U.S. patent application Ser. No. 13/317,468 entitled COMPACT EDGE ILLUMINATED EYEGLASS DISPLAY; U.S. patent application Ser. No. 13/869,866 entitled HOLOGRAPHIC WIDE ANGLE DISPLAY; U.S. patent application Ser. No. 13/844,456 entitled TRANSPARENT WAVEGUIDE DISPLAY; U.S. patent application Ser. No. 14/620,969 entitled WAVEGUIDE GRATING DEVICE; U.S. Provisional Patent Application No. 62/176,572 entitled ELECTRICALLY FOCUS TUNABLE LENS, U.S. Provisional Patent Application No. 62/177,494 entitled WAVEGUIDE DEVICE INCORPORATING A LIGHT PIPE, U.S. Provisional Patent Application No. 62/071,277 entitled METHOD AND APPARATUS FOR GENERATING INPUT IMAGES FOR HOLOGRAPHIC WAVEGUIDE DISPLAYS; U.S. Provisional Patent Application No. 62/123,282 entitled NEAR EYE DISPLAY USING GRADIENT INDEX OPTICS; U.S. Provisional Patent Application No. 62/124,550 entitled WAVEGUIDE DISPLAY USING GRADIENT INDEX OPTICS; U.S. Provisional Patent Application No. 62/125,064 entitled OPTICAL WAVEGUIDE DISPLAYS FOR INTEGRATION Ind. WINDOWS; U.S. Provisional Patent Application No. 62/125,066 entitled OPTICAL WAVEGUIDE DISPLAYS FOR INTEGRATION Ind. WINDOWS; U.S. Provisional Patent Application No. 62/125,089 entitled HOLOGRAPHIC WAVEGUIDE LIGHT FIELD DISPLAYS; U.S. Pat. No. 8,224,133 entitled LASER ILLUMINATION DEVICE; U.S. Pat. No. 8,565,560 entitled LASER ILLUMINATION DEVICE; U.S. Pat. No. 6,115,152 entitled HOLOGRAPHIC ILLUMINATION SYSTEM; PCT Application No. PCT/GB2013/000005 entitled CONTACT IMAGE SENSOR USING SWITCHABLE BRAGG GRATINGS; PCT Application No. PCT/GB2012/000680 entitled IMPROVEMENTS TO HOLOGRAPHIC POLYMER DISPERSED LIQUID CRYSTAL MATERIALS AND DEVICES; PCT Application No. PCT/GB2014/000197 entitled HOLOGRAPHIC WAVEGUIDE EYE TRACKER; PCT/GB2013/000210 entitled APPARATUS FOR EYE TRACKING; PCT Application No. GB2013/000210 entitled APPARATUS FOR EYE TRACKING; PCT/GB2015/000274 entitled HOLOGRAPHIC WAVEGUIDE OPTICALTRACKER; U.S. Pat. No. 8,903,207 entitled SYSTEM AND METHOD OF EXTENDING VERTICAL FIELD OF VIEW IN HEAD UP DISPLAY USING A WAVEGUIDE COMBINER; U.S. Pat. No. 8,639,072 entitled COMPACT WEARABLE DISPLAY; U.S. Pat. No. 8,885,112 entitled COMPACT HOLOGRAPHIC EDGE ILLUMINATED EYEGLASS DISPLAY; U.S. Provisional Patent Application No. 62/390,271 entitled HOLOGRAPHIC WAVEGUIDE DEVICES FOR USE WITH UNPOLARIZED LIGHT; U.S. Provisional Patent Application No. 62/391,333 entitled METHOD AND APPARATUS FOR PROVIDING A POLARIZATION SELECTIVE HOLOGRAPHIC WAVEGUIDE DEVICE; U.S. Provisional Patent Application No. 62/493,578 entitled WAVEGUIDE DISPLAY APPARATUS; U.S. Provisional Patent Application No. 62/497,781 entitled APPARATUS FOR HOMOGENIZING THE OUPUT FROM A WAVEGUIDE DEVICE; PCT Application No.: PCT/GB2016000181 entitled WAVEGUIDE DISPLAY; and PCT/GB2016/00005 entitled ENVIRONMENTALLY ISOLATED WAVEGUIDE DISPLAY.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 16E provides a schematic cross section view of a detail of a waveguide in which a debanding optic is a tilted input image generator providing an exit pupil in one embodiment.

FIG. 16F provides a schematic cross section view of a detail of a waveguide in which a debanding optic a tilted input image generator providing an exit pupil and various projected pupils in one embodiment.

FIG. 16G provides a schematic cross section view of a detail of a waveguide in which a debanding optic is a tilted input image generator and a coupling prism in one embodiment.

FIG. 16H provides a schematic cross section view of a detail of a waveguide in which a debanding optic is a plurality of additional substrates having light absorbing edges in one embodiment.

DETAILED DESCRIPTION OF THE INVENTION

Figure 1A:
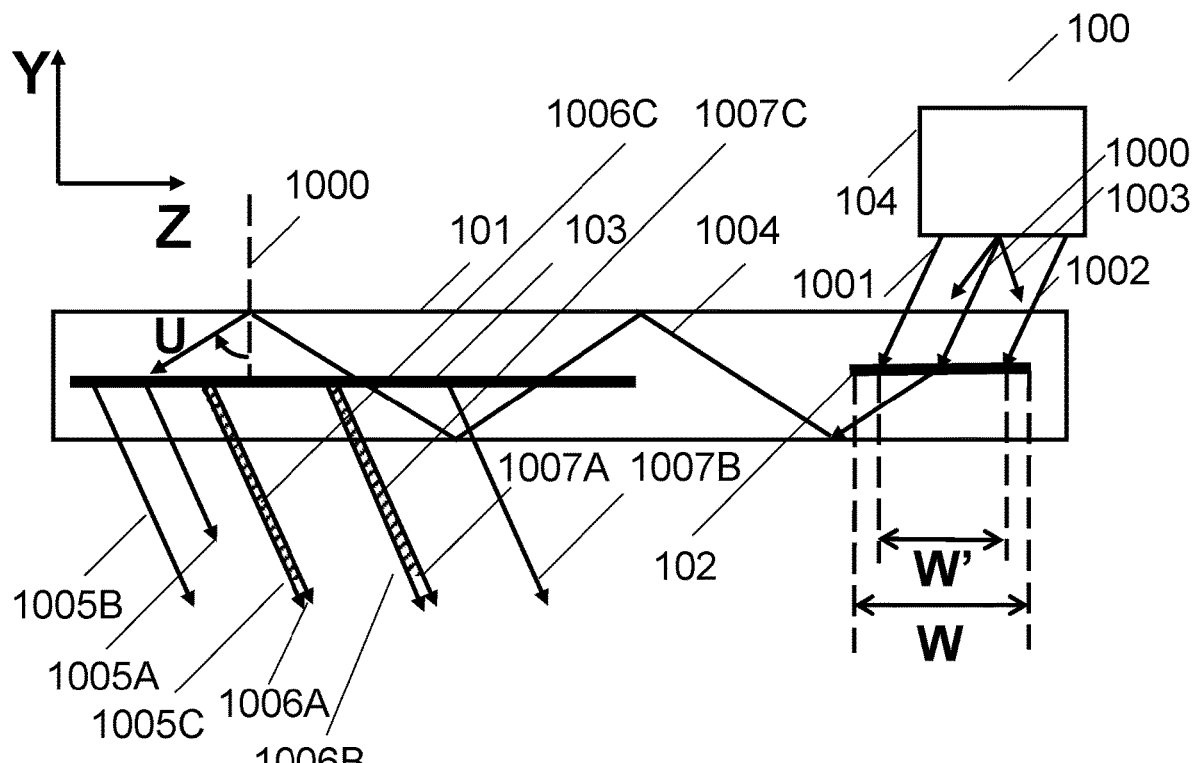
FIG. 1A provides a schematic cross section view of a waveguide exhibiting banding in one embodiment.

Turning now to the drawings, systems and methods relating to near-eye display or head up display systems are shown according to various embodiments. A number of embodiments are directed to waveguide devices for use in near-eye display or head up display systems. A common complication existing in many waveguide devices is banding in the output illumination that affects its uniformity. Accordingly, various embodiments of waveguide devices having uniform output illumination are provided. In numerous embodiments of waveguide devices, a debanding optic is incorporated to eliminate or mitigate banding effects.

Many embodiments are also directed to holographic waveguide technology that can be advantageously utilized in waveguide devices. In some embodiments, the holographic waveguide technology is used for helmet mounted displays or head mounted displays (HMDs) and head up displays (HUDs). In several embodiments, holographic waveguide technology is used in many applications, including avionics applications and consumer applications (e.g., augmented reality glasses, etc.). In a number of embodiments, an eye is positioned within an exit pupil or an eye box of a display.

In many embodiments, waveguide devices provide pupil expansion in two orthogonal directions using a single waveguide layer. Uniformity of output is achieved, in accordance with various embodiments, by designing an output grating to have diffraction efficiency varying from a low value near an input end of the waveguide substrate to a high value at the furthest extremity of an output grating. In a number of embodiments, input image data is provided by a microdisplay external to a waveguide optical substrate and coupled to the substrate by means of an input grating. A microdisplay, in accordance with multiple embodiments, is a reflective array and illuminated via a beamsplitter. A reflected image light is collimated such that each pixel of the image provides a parallel beam in a unique direction.

In accordance with a number of embodiments, a waveguide device is coupling image content into a waveguide efficiently and in such a way that a waveguide image is free from chromatic dispersion and brightness non-uniformity. One way to prevent chromatic dispersion and to achieve better collimation is to use lasers. The use of lasers, however, suffer from pupil banding artifacts which manifest themselves in the output illumination causing disruption of the uniformity of the image. Banding artifacts are able to form when a collimated pupil is replicated (expanded) in a total internal reflection (TIR) waveguide. Banding occurs when some light beams diffracted out of the waveguide each time the beam interacts with the grating exhibit gaps or overlaps, leading to an illumination ripple. The degree of ripple is a function of field angle, waveguide thickness, and aperture thickness. As portrayed in the various embodiments described herein, it was found by experimentation and simulation that the effect of banding can be smoothed by dispersion with broadband sources such as light-emitting diodes (LEDs). LED illumination, however, is not entirely free from the banding problem, particularly for higher waveguide thickness to waveguide input-aperture ratios. Moreover, LED illumination tends to result in bulky input optics and an increase in the thickness of the waveguide device. Accordingly, a number of embodiments of waveguide devices described herein have a compact and efficient debanding optic for homogenizing the light output from holographs to prevent banding distortion.

Banding effects contribute to non-uniformity of an output illumination. As discovered in several prototype tests, a practical illumination from a waveguide device should achieve less than 20% and preferably not more than 10% non-uniformity to provide an acceptable viewable image. Achieving low non-uniformity requires tradeoffs against other system requirements, particularly image brightness. The tradeoffs are difficult to define in precise terms and are very much dependent on application. Since many optical techniques for reducing non-uniformity generally incur some light loss, output image brightness might be reduced. As the sensitivity of the human visual system to non-uniformity increases with light level, the problem of non-uniformity becomes more acute for displays, such as car HUDs, which require a high luminous flux to achieve high display to background scene contrasts. Accordingly, in some embodiments, extracted light has a spatial non-uniformity less than 10%. In a number of embodiments, extracted light has a spatial non-uniformity less than 20%.

Several embodiments of the invention will now be further described with reference to the accompanying drawings. For the purposes of explaining the various embodiments of the invention, well-known features of optical technology known to those skilled in the art of optical design and visual displays may have been omitted or simplified in order not to obscure the basic principles of the various embodiments. Description of the various embodiments will be presented using terminology commonly employed by those skilled in the art of optical design. Unless otherwise stated the term "on-axis" in relation to a ray or a beam direction refers to propagation parallel to an axis normal to the surfaces of the optical components described in relation to various devices. In the following description, the terms light, ray, beam and direction may be used interchangeably and in association with each other to indicate the direction of propagation of electromagnetic radiation along rectilinear trajectories. The term light and illumination may be used in relation to the visible and infrared bands of the electromagnetic spectrum. As used herein, the term grating may encompass a grating comprised of a set of gratings in some embodiments.

Waveguide Devices

In accordance with a number of embodiments, a waveguide device includes at least one optical substrate, at least one light source, at least one light coupler to couple the light from the source into the optical substrate, and at least one light extractor to extract the light from the optical substrate to form an output illumination. Depicted in FIG. 1A is an embodiment of a waveguide device. Accordingly, the waveguide device (100) includes at least one optical substrate (101), at least one input grating (102), and at least one output grating (103). The input grating (102), which has a maximum aperture W, couples light (ray arrows 1000-1002), from a light source (104) into a total internal reflection (TIR) path (1004) within the waveguide substrate (101). The input (102) and output (103) gratings as depicted in FIG. 1A may exist in any appropriate configuration, such as the grating configurations described herein.

In a number of embodiments, a waveguide device includes an input image generator, which further includes an input image generator having a light source, a microdisplay panel, and optics for collimating the light. In the description of some embodiments, an input generator is referred to as a picture generation unit (PGU). In some embodiments, a source may be configured to provide general illumination that is not modulated with image information. In many embodiments, an input image generator projects the image displayed on the microdisplay panel such that each display pixel is converted into a unique angular direction within the substrate waveguide. In various embodiments, collimation optics include at least a lens and mirrors. In many embodiments, lens and mirrors are diffractive. In some embodiments, a light source is at least one laser. In numerous embodiments, a light source is at least one LED. In many embodiments, various combinations of different light sources are used within an input image generator.

It should be understood that a number of input image generators may be used in accordance with various embodiments of the invention, such as, for example, those described in U.S. patent application Ser. No. 13/869,866 entitled HOLOGRAPHIC WIDE ANGLE DISPLAY and U.S. patent application Ser. No. 13/844,456 entitled TRANSPARENT WAVEGUIDE DISPLAY. In many embodiments, an input image generator contains a beamsplitter for directing light onto the microdisplay and transmitting the reflected light towards the waveguide. In several embodiments, a beamsplitter is a grating recorded in holographic polymer dispersed liquid crystal (HPDLC). In numerous embodiments, a beam splitter is a polarizing beam splitter cube. In some embodiments, an input image generator incorporates a despeckler. Any appropriate despeckler can be used in various embodiments, such as those, for example, described in U.S. Pat. No. 8,565,560 entitled LASER ILLUMINATION DEVICE.

In a number of embodiments, a light source further incorporates one or more lenses for modifying an illumination beam's angular characteristics. In many embodiments, an image source is a microdisplay or laser-based display. Several embodiments of light sources utilize LEDs, which may provide better uniformity than laser. If laser illumination is used, the risk of illumination banding effects are higher, but may still be eliminated or mitigated in accordance with various embodiments as described herein. In numerous embodiments, light from a light source is polarized. In multiple embodiments, an image source is a liquid crystal display (LCD) microdisplay or liquid crystal on silicon (LCoS) microdisplay.

In some embodiments, an input image generator optics includes a polarizing beam splitter cube. In many embodiments, an input image generator optics includes an inclined plate to which a beam splitter coating has been applied. In a number of embodiments, an input image generator optics incorporates a switchable Bragg grating (SBG), which acts as a polarization selective beam splitter. Examples of input image generator optics incorporating a SBG are disclosed in U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY. In many embodiments, an input image generator optics contains at least one of a refractive component and curved reflecting surfaces or a diffractive optical element for controlling the numerical aperture of the illumination light. In multiple embodiments, an input image generator contains spectral filters for controlling the wavelength characteristics of the illumination light. In several embodiments, an input image generator optics contains apertures, masks, filter, and coatings for controlling stray light. In some embodiments, a microdisplay incorporates birdbath optics.

Returning to an embodiment depicted in FIG. 1A, the external source (102) provides collimated rays in an angular bandwidth (1002). Light in the TIR path (1004) interacts with the output grating (103), extracting a portion of the light each time the TIR light satisfies the condition for diffraction by the grating. In the case of a Bragg grating extraction occurs when the Bragg condition is met. For example, light TIR ray path (1004), which corresponds to the TIR angle U, is diffracted by the output grating into output direction (1005A). It should be apparent from basic geometrical optics that a unique TIR angle is defined by each light incidence angle at the input grating. Light is extracted, and as depicted forms three extraction beams, which are each depicted as flanked by two light rays (1005B & 1005C; 1006A & 1006B; 1007A & 1007B). Perfectly collimated gaps (1006C & 1007C, depicted as cross-hatching) will exit between adjacent beam extracts, resulting in a banding effect. In accordance with a number of embodiments, beam gaps that cause banding are eliminated or minimized by a number of debanding optics as described herein. For example, a debanding optic configures the light such that the input grating has an effective input aperture W that depends on the TIR angle U.

In a multitude of embodiments, a waveguide device incorporates a debanding optic capable of shifting a pupil to configure the light coupled into the waveguide such that the input grating has an effective input aperture which is a function of the TIR angle. The effect of the debanding optic is that successive light extractions from the waveguide by the output grating integrate to provide a substantially flat illumination profile for any light incidence angle at the input grating. In some embodiments, a debanding optic is implemented by combining various types of optical beam-modifying layers, including (but not limited to) gratings, partially reflecting films, liquid crystal alignment layers, isotropic refractive layers and gradient index (GRIN) structures. It should be understood, that the term "beam-modifying" refers to the variation of amplitude, polarization, phase, and wavefront displacement in 3D space as a function of incidence light angle. In each case, beam-modifying layers, in accordance with several embodiments, provide an effective aperture that gives uniform extraction across the output grating for any light incidence angle at the input grating. In many embodiments, beam-modifying layers are used in conjunction with a means for controlling the numerical aperture of the input light as a function of input angle. In some embodiments, beam-modifying layers are used in conjunction with techniques for providing wavelength diversity.

Figure 1B:
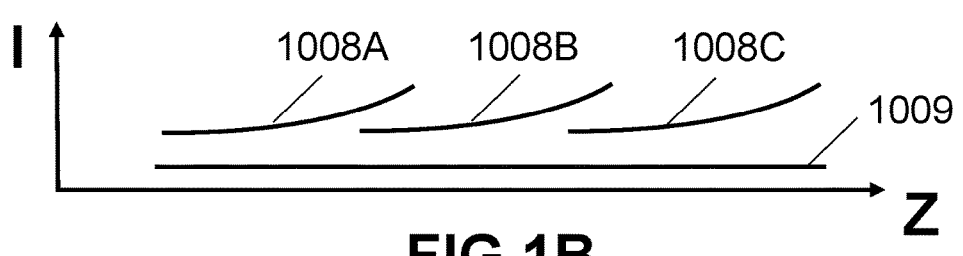
FIG. 1B provides a chart showing the integration of light extracted from a waveguide to provide debanded illumination in one embodiment.

FIG. 1B provides a chart illustrating the effect of pupil shifting optics on the light output (labeled I) from the waveguide along a principal propagation direction labeled as Z (referring to the coordinate system shown in FIG. 1A). Intensity profiles (1008A-1008C) for three successive extractions corresponding to an input light direction are shown. The shape of the intensity profiles is controlled by the prescriptions of beam-modifying layers. In a number of embodiments, intensity profiles are integrated to provide a substantially flat intensity profile. For example, the intensity profiles (1008A-1008C) are integrated into a flat profile (1009).

Input Couplers and Extractors Utilized in Waveguide Devices

Waveguide devices are currently of interest in a range of display and sensor applications. Although much of the earlier work on devices has been directed at reflection holograms, transmission, devices are proving to be much more versatile as optical system building blocks. Accordingly, a number of embodiments are directed to the use of gratings in waveguide devices, which may be used for input or output of pupil. In many embodiments, an input grating is a type of input coupler of light to couple light from a source into a waveguide. In numerous embodiments, an output grating is a type of light extractor of light to extract light from a waveguide to form an output illumination. In several embodiments, waveguide devices utilize a Bragg grating (also referred to as a volume grating). Bragg gratings have high efficiency with little light being diffracted into higher orders. The relative amount of light in the diffracted and zero order can be varied by controlling the refractive index modulation of the grating, a property that is used to make lossy waveguide gratings for extracting light over a large pupil.

As used herein, the term grating may encompass a grating comprised of a set of gratings in some embodiments. For example, in some embodiments an input grating and/or output grating separately comprise two or more gratings multiplexed into a single layer. It is well established in the literature of holography that more than one holographic prescription can be recorded into a single holographic layer. Methods for recording such multiplexed holograms are well known to those skilled in the art. In some embodiments, an input grating and/or output grating separately comprise two overlapping gratings layers that are in contact or vertically separated by one or more thin optical substrate. In many embodiments, grating layers are sandwiched between flanking glass or plastic substrates. In several embodiments, two or more gratings layers may form a stack within which total internal reflection occurs at the outer substrate and air interfaces. In a number of embodiments, a waveguide device may comprise just one grating layer. In some embodiments, electrodes are applied to faces of substrates to switch gratings between diffracting and clear states. A stack, in accordance with numerous embodiments, further includes additional layers such as beam splitting coatings and environmental protection layers.

In numerous embodiments, a grating layer is broken up into separate layers. A number of layers are laminated together into a single waveguide substrate, in accordance with various embodiments. In some embodiments, a grating layer is made of several pieces including an input coupler, a fold grating, and an output grating (or portions thereof) that are laminated together to form a single substrate waveguide. In many embodiments, pieces of waveguide devices are separated by optical glue or other transparent material of refractive index matching that of the pieces. In a multitude of embodiments, a grating layer is formed via a cell making process by creating cells of the desired grating thickness and vacuum filling each cell with Switchable Bragg Grating (SBG) material for each of an input coupler, a fold grating, and an output grating. In a number of embodiments, a cell is formed by positioning multiple plates of glass with gaps between the plates of glass that define the desired grating thickness for an input coupler, a fold grating, and an output grating. In many embodiments, one cell may be made with multiple apertures such that the separate apertures are filled with different pockets of SBG material. Any intervening spaces, according to various embodiments, are separated by a separating material (e.g., glue, oil, etc.) to define separate areas. In multiple embodiments, SBG material is spin-coated onto a substrate and then covered by a second substrate after curing of the material. By using a fold grating, a waveguide display advantageously requires fewer layers than previous systems and methods of displaying information according to some embodiments. In addition, by using a fold grating, light can travel by total internal refection within the waveguide in a single rectangular prism defined by the waveguide outer surfaces while achieving dual pupil expansion. In many embodiments, an input coupler and gratings can be created by interfering two waves of light at an angle within the substrate to create a holographic wave front, thereby creating light and dark fringes that are set in the waveguide substrate at a desired angle. In numerous embodiments, a grating in a given layer is recorded in stepwise fashion by scanning or stepping the recording laser beams across the grating area. In some embodiments, gratings are recorded using mastering and contact copying process currently used in the holographic printing industry.

Input and output gratings, in accordance with many embodiments, are designed to have common surface grating pitch. In some embodiments, an input grating combines a plurality of gratings orientated such that each grating diffracts a polarization of the incident unpolarized light into a waveguide path. In many embodiments, an output grating combines a plurality of gratings orientated such that the light from the waveguide paths is combined and coupled out of the waveguide as unpolarized light. Each grating is characterized by at least one grating vector (or K-vector) in 3D space, which in the case of a Bragg grating is defined as the vector normal to the Bragg fringes. A grating vector determines an optical efficiency for a given range of input and diffracted angles.

One important class of gratings is known as Switchable Bragg Gratings (SBG), which are utilized in various waveguide devices in accordance with many embodiments. Typically, a holographic polymer dispersed liquid crystal (HPDLC) is used in SBGs. In many embodiments, HPDLC includes a mixture liquid crystal (LC), monomers, photoinitiator dyes, and coinitiators. Often, a mixture also includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices. One of the known attributes of transmission SBGs is that the LC molecules tend to align normal to the grating fringe planes. The effect of the LC molecule alignment is that transmission SBGs efficiently diffract P polarized light (i.e., light with the polarization vector in the plane of incidence) but have nearly zero diffraction efficiency for S polarized light (i.e., light with the polarization vector normal to the plane of incidence). Transmission SBGs may not be used at near-grazing incidence as the diffraction efficiency of any grating for P polarization falls to zero when the included angle between the incident and reflected light is small.

In a number of embodiments, SBGs are fabricated by first placing a thin film of a mixture of photopolymerizable monomers and liquid crystal material between parallel glass plates. One or both glass plates support electrodes for applying an electric field across the film. In numerous embodiments, electrodes are made at least in part by transparent indium tin oxide films. A volume phase grating can then be recorded by illuminating liquid crystal material (often referred to as the syrup) with two mutually coherent laser beams, which interfere to form a slanted fringe grating structure, in accordance with multiple embodiments. During a recording process, monomers polymerize and the mixture undergoes a phase separation, creating regions densely populated by liquid crystal micro-droplets, interspersed with regions of clear polymer, resulting in a HPDLC. In accordance with several embodiments, alternating liquid crystal-rich and liquid crystal-depleted regions of an HPDLC device form fringe planes of a grating. A resulting volume phase grating can exhibit very high diffraction efficiency, which may be controlled, in accordance with various embodiments, by the magnitude of the electric field applied across the film. When an electric field is applied to a grating via transparent electrodes, a natural orientation of the LC droplets is changed, reducing the refractive index modulation of the fringes and dropping a hologram diffraction efficiency to very low levels. Typically, SBG Elements are switched clear in 30 μs, with a longer relaxation time to switch ON. Note that the diffraction efficiency of a device can be adjusted, in accordance with many embodiments, by means of applied voltage over a continuous range. A device exhibits near 100% efficiency when no voltage is applied and near-zero efficiency when a sufficiently high voltage is applied. In certain embodiments, of HPDLC devices, magnetic fields may be used to control the LC orientation. In certain embodiments of HPDLC devices, phase separation of LC material from polymer may be accomplished to such a degree that no discernible droplet structure results. In a number of embodiments, a SBG is also used as a passive grating, which may provide a benefit of a uniquely high refractive index modulation.

According to numerous embodiments, SBGs are used to provide transmission or reflection gratings for free space applications. Various embodiments of SBGs are implemented as waveguide devices in which the HPDLC forms either the waveguide core or an evanescently coupled layer in proximity to the waveguide. In many embodiments, parallel glass plates used to form the HPDLC cell provide a total internal reflection (TIR) light guiding structure. Light is coupled out of a SBG, in accordance with several embodiments, when a switchable grating diffracts light at an angle beyond the TIR condition.

In many embodiments of waveguide devices based on SBGs, gratings are formed in a single layer sandwiched by transparent substrates. In a number of embodiments, a waveguide is just one grating layer. In various embodiments that incorporate switchable gratings, transparent electrodes are applied to opposing surfaces of the substrate layers sandwiching the switchable grating. In some embodiments, cell substrates are fabricated from glass. An exemplary glass substrate is standard Corning Willow glass substrate (index 1.51), which is available in thicknesses down to 50 microns. In a number of embodiments, cell substrates are optical plastics.

It should be understood that Bragg gratings could also be recorded in other materials. In several embodiments, SBGs are recorded in a uniform modulation material, such as POLICRYPS or POLIPHEM having a matrix of solid liquid crystals dispersed in a liquid polymer. In multiple embodiments, SBGs are non-switchable (i.e., passive). Non-switchable SBGs may have the advantage over conventional holographic photopolymer materials of being capable of providing high refractive index modulation due to its liquid crystal component. Exemplary uniform modulation liquid crystal-polymer material systems are disclosed in United State Patent Application Publication No. US2007/0019152 by Caputo et al and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter. In many embodiments, at least one grating is a surface relief grating. In some embodiments at least one grating is a thin (or Raman-Nath) hologram.

In multiple embodiments, gratings are recorded in a reverse mode HPDLC material. Reverse mode HPDLC differs from conventional HPDLC in that the grating is passive when no electric field is applied and becomes diffractive in the presence of an electric field. Reverse mode HPDLC may be based on any of the recipes and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. A grating may be recorded in any of the above material systems, in accordance of various embodiments, but used in a passive (non-switchable) mode. The fabrication process is identical to that used for switchable gratings, but with an electrode coating stage being omitted. LC polymer material systems are highly desirable in view of their high index modulation. In some embodiments, gratings are recorded in HPDLC but are not switchable.

In some embodiments, a grating encodes optical power for adjusting the collimation of the output. In many embodiments, an output image is at infinity. In numerous embodiments, an output image may be formed at distances of several meters from an eye box.

In several embodiments, an input grating may be replaced by another type of input coupler. In particular embodiments, an input grating is replaced with a prism or reflective surface. In a number of embodiments, an input coupler can be a holographic grating, such as a switchable or non-switchable SBG grating. The input coupler is configured to receive collimated light from a display source and to cause the light to travel within the waveguide via total internal reflection between the first surface and second surfaces.

It is well established in the literature of holography that more than one holographic prescriptions can be recorded into a single holographic layer. Methods for recording such multiplexed holograms are well known to those skilled in the art. In some embodiments, at least one of an input or output grating combines two or more angular diffraction prescriptions to expand the angular bandwidth. In many embodiments, at least one of the input or output gratings combines two or more spectral diffraction prescriptions to expand the spectral bandwidth. In numerous embodiments, a color multiplexed grating is used to diffract two or more primary colors.

Many embodiments, as described herein, are operated in monochrome. A color waveguide, however according to various embodiments of the invention, includes a stack of monochrome waveguides. In a number of embodiments, a waveguide device uses red, green and blue waveguide layers. In several embodiments, a waveguide device uses red and blue/green layers. In some embodiments, gratings are all passive, that is, non-switchable. In multiple embodiments, at least one grating is switchable. In a number of embodiments, input gratings in each layer are switchable to avoid color crosstalk between waveguide layers. In some embodiments, color crosstalk is avoided by disposing dichroic filters between the input grating regions of the red and blue and the blue and green waveguides.

In a number of embodiments, light is characterized by a wavelength bandwidth. In many embodiments, a waveguide device is capable of diversifying the wavelength bandwidth of light. In accordance to various embodiments, Bragg gratings, which are inherently spectral bandwidth limited devices, are most efficiently utilized with narrow band sources such as LEDs and lasers. A Bragg grating, in accordance to many embodiments, diffracts two different wavelength bands with high efficiency when the grating prescription and the incident light ray angles satisfy the Bragg equation. Full color waveguides, in accordance to multiple embodiments, utilize separate specific wavelength layers, such as, red, green and blue diffracting waveguide layers. Two-layer solutions in which one layer diffracts two of the three primary colors are used in numerous embodiments. In many embodiments, a natural spectral bandwidth of a Bragg grating is adequate for minimizing color cross talk. For tighter control of color crosstalk, however, additional components such as dichroic filters and narrow band filters integrated between waveguide layers and, typically, overlapping the input gratings may be used.

Debanding Optics

Figure 2:
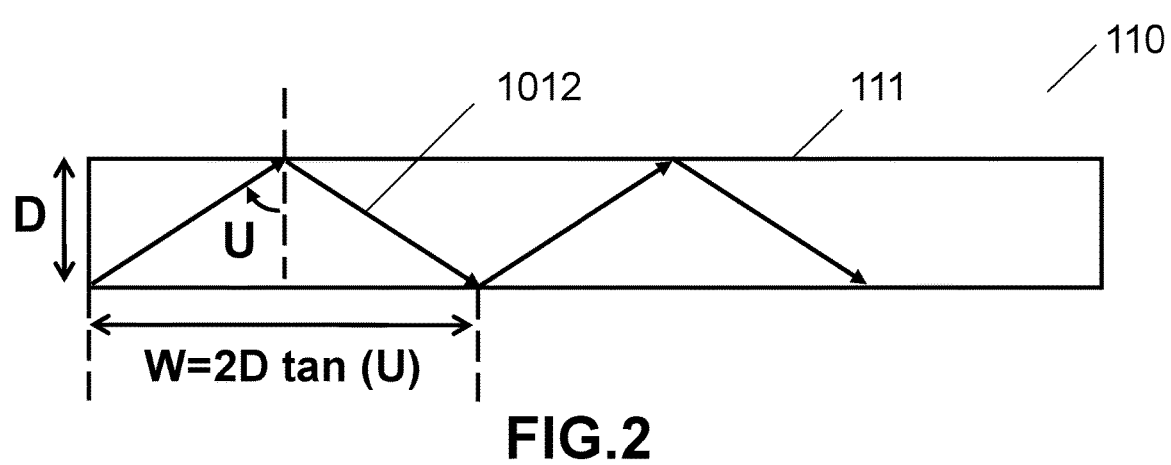
FIG. 2 provides a schematic plan view of a detail of a waveguide illustrating a geometrical optical condition for debanding to occur in one embodiment.

In numerous embodiments, a debanding optic is an effective input aperture such that when the optical substrate has a thickness D, the input aperture is configured to provide a TIR angle U in the optical substrate, and the angle U is calculated by 2D tan (U). Provided in FIG. 2 is an embodiment of a waveguide device (110) incorporating a debanding optic in a form of a waveguide that includes a waveguide substrate (111) and a TIR (1012) such that a condition of zero banding exists. In many embodiments, a condition of zero banding, that is no gaps between successive light extractions along the TIR ray path, occurs when the effective input aperture for a TIR angle U and a waveguide substrate thickness D is given by 2D tan (U).

Figure 3:
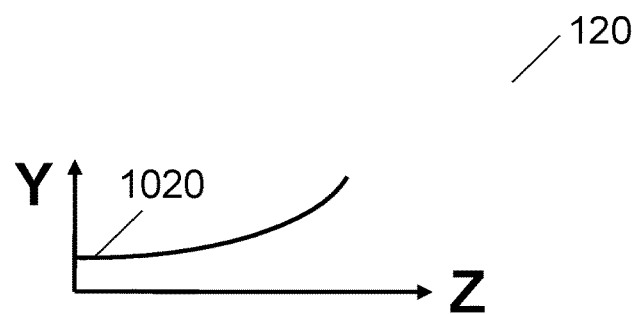
FIG. 3 provides a chart showing the spatial variation of an optical characteristic of an optical layer used to provide a pupil shifting means in one embodiment.

In some embodiments, a debanding optic provides spatial variation of the light along a TIR path of at least one of diffraction efficiency, optical transmission, polarization or birefringence. A typical spatial variation (120) is provided in the chart FIG. 3 by the curve (1020) where the Y-axis refers to the value of any of the above parameters (e.g., diffraction efficiency) and X-axis is a beam propagation direction within the waveguide. In a number of embodiments, a spatial variation is in two dimensions (in the plane of the waveguide).

In some embodiments, a debanding optic is at least one grating configured to have multiple gratings, such that each grating provides a small pupil shift to eliminate or mitigate banding. In many embodiments, a stack of multiple gratings achieves a small pupil shift when separations between the gratings within the stack are designed to provide a pupil shift for each angle. In a number of embodiments, gratings capable of a pupil shift are separated by transparent substrates. In several embodiments, gratings capable of a pupil shift are passive. Alternatively, in some embodiments, gratings are switched on when a voltage is applied. In some embodiments, multiple gratings arranged to have lateral relative displacements provides a pupil shift. In numerous embodiments, multiple gratings are configured in a two-dimensional array with different sub arrays of grating elements being switched in to their diffraction states according to an incidence angle. In some embodiments, gratings are configured as stacks of arrays. In various embodiments, separate gratings are provided for different wavelength bands. In a number of embodiments, a grating is multiplexed.

In many embodiments, gratings have grating parameters that vary across the principal plane of a waveguide. In some embodiments, a diffraction efficiency is varied to control the amount of light diffracted versus the amount of light transmitted down the waveguide as zero order light, thereby enabling the uniformity of light extracted from the waveguide to be fine-tuned. In several embodiments, K-vectors of at least one grating has rolled K-vectors which have directions optimized to fine tune the uniformity of light extracted from the waveguide. In various embodiments, an index modulation of gratings is varied to fine tune the uniformity of light extracted from the waveguide. In numerous embodiments, a thickness of the gratings is varied to fine tune the uniformity of light extracted from the waveguide.

Figure 4:
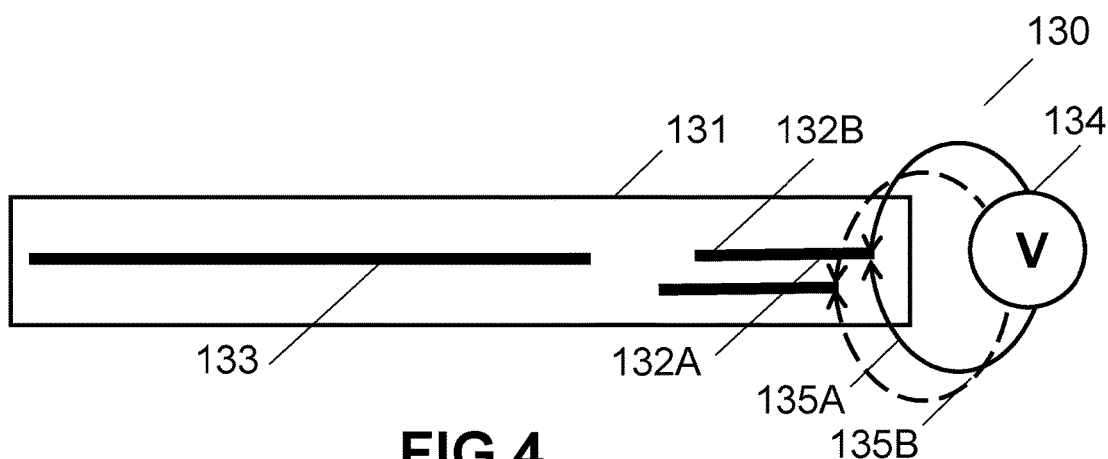
FIG. 4 provides a schematic cross section view of a waveguide using a switchable input grating in one embodiment.
Figure 5:
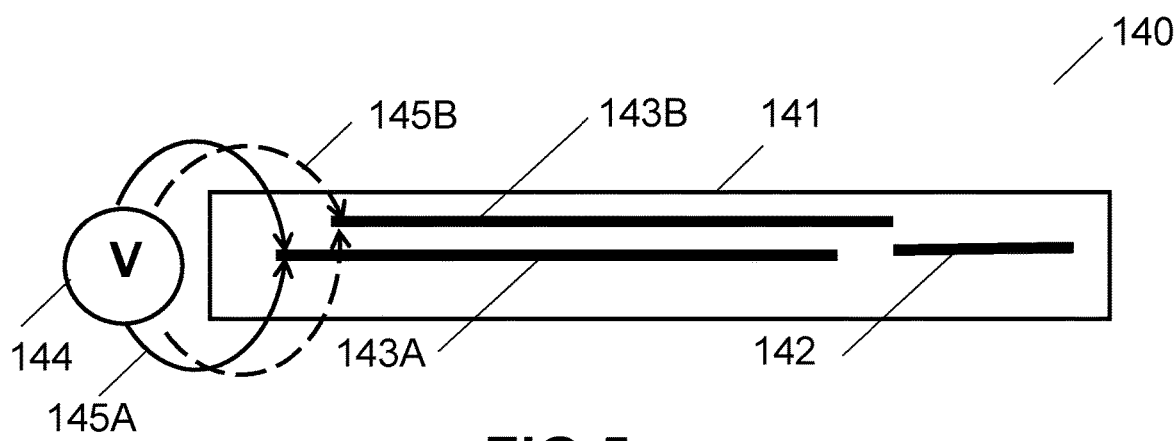
FIG. 5 provides a schematic cross section view of a waveguide using a switchable output grating in one embodiment.

In a number of embodiments, a debanding optic is at least one grating configured as a stacked switchable grating that turns on when a voltage is applied, shifting pupil to eliminate or mitigate banding effects. Depicted in FIG. 4 is an embodiment of a waveguide device (130) with an optical substrate (131) having stacked switchable input gratings (132A & 132B) and a non-switchable output grating (133). A voltage supply (134) is coupled to the input gratings (132A & 132B) by an electrical connection (135A & 135B) to switch on the input gratings (132A & 132B) to provide pupil shift. Depicted in FIG. 5 is an embodiment of a waveguide device (141) having a non-switchable input grating and a switchable output gating having stacked grating layers (143A & 143B). A voltage supply (144) is coupled to the output gratings (143A & 143B) by an electrical connection (145A & 145B) to switch on the output gratings (143A & 143B) to provide a pupil shift. In various embodiments, a thin substrate layer exits between stacked gratings to provide at least some separation.

Figure 6A:
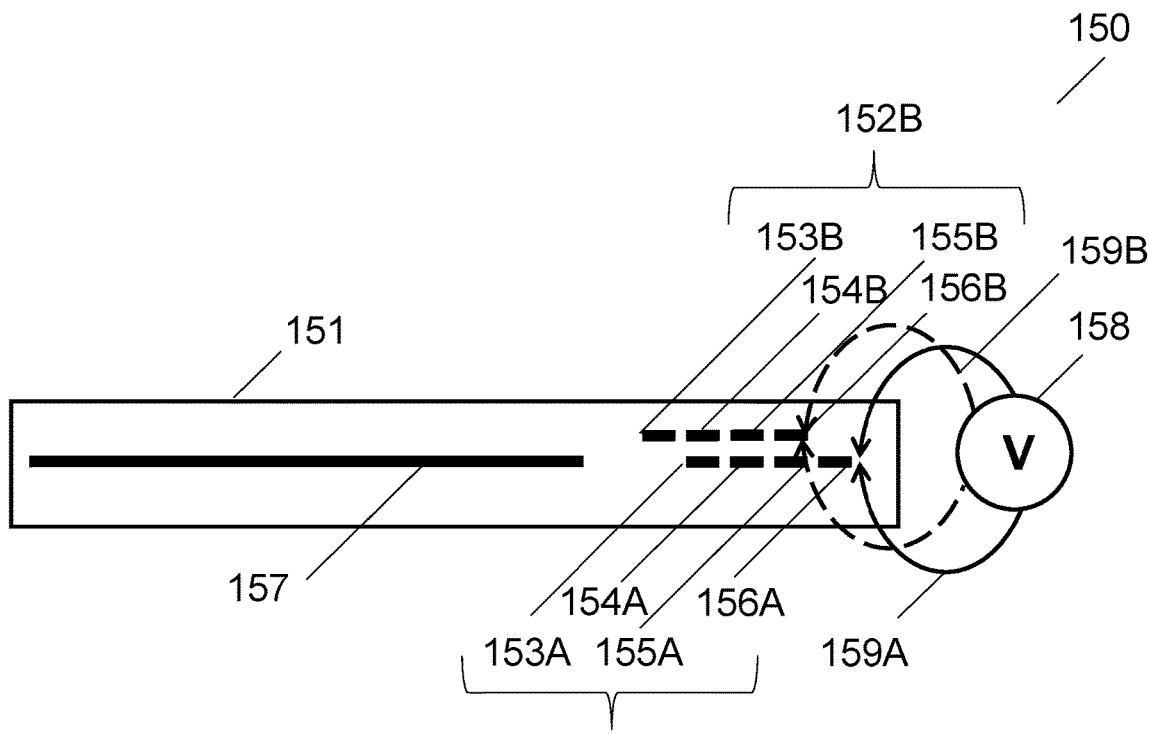
FIG. 6A provides a schematic cross section view of a waveguide using a switchable input grating array in one embodiment.

In some embodiments, a debanding optic is at least one grating configured as an array of switchable grating elements that can turn on a specific element when a voltage is applied, shifting pupil to eliminate or mitigate banding effects. Depicted in FIG. 6A is an embodiment of a waveguide device (150) having an optical substrate (151) that contains input gratings (152A & 152B) each having a plurality of grating elements (153A-156A & 153B-156B) and an output grating (157). The waveguide device further includes a voltage supply (158) coupled to each input grating (152A & 152B) by an electrical connection (159A & 159B) configured to individually switch on each element (e.g., 156A & 156B) to shift pupil. Although not depicted, it should be understood that a voltage supply can be connected to each and every element to create an array of switchable elements. Furthermore, although FIG. 6A only depicts an input grating configured to be an array, it should be understood that an output grating can also be an array of elements, each element configured to be switchable, in accordance with a number of embodiments of the invention.

Figure 6B:
FIG. 6B provides a detail of a switchable grating showing rolled K-vectors in one embodiment.
Figure 7:
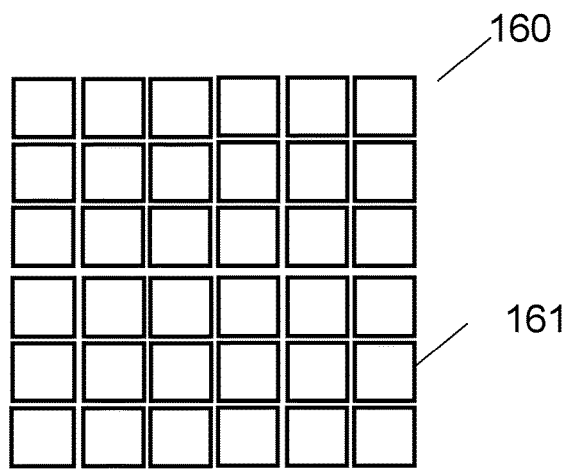
FIG. 7 provides a schematic plan view of a switchable input grating array in one embodiment.

In various embodiments, a grating has a plurality of rolled K-vectors. A K-vector is a vector aligned normal to the grating planes (or fringes) which determines the optical efficiency for a given range of input and diffracted angles. Rolling K-vectors, in accordance with a number of embodiments, allows an angular bandwidth of a grating to be expanded without the need to increase the waveguide thickness. Depicted in FIG. 6B is an embodiment of a grating (152C) having four rolled K-vectors ($K_1$-$K_4$). In a number of embodiments, a grating is configured as a two-dimensional array of switchable elements. For example, depicted in FIG. 7, a grating is configured as a two-dimensional array (160) of switchable elements (e.g., 161).

In numerous embodiments, a debanding optic is at least one grating configured to be a plurality of passive grating layers configured to shift pupil to eliminate or mitigate banding effects. When a waveguide device incorporates multiple passive grating layers, in accordance with various embodiments, the basic architecture is similar to some of the embodiments that incorporate active grating layers (e.g., see FIGS. 4 & 5) but without a voltage supply. In some embodiments, it is advantageous to use SBGs in non-switchable mode to take advantage of the higher index modulation afforded by a number of liquid crystal polymer material systems. In many embodiments, a debanding optic is at least one multiplexed grating configured to shift pupil to eliminate or mitigate banding effects.

In some embodiments, a waveguide device includes a fold grating for providing exit pupil expansion. It should be understood that various fold gratings may be used in accordance with various embodiments of the invention. Examples of various fold gratings that may be used in a multitude of embodiments are disclosed in PCT Application No. PCT/GB2016000181 entitled WAVEGUIDE DISPLAY or as described in other references cited herein. A fold grating, in accordance of several embodiments, incorporates multiple gratings for pupil shifting to eliminate or mitigate banding effects, with each grating providing a small pupil shift.

In many embodiments, a debanding optic is one or more index layers disposed within an optical substrate such that the one or more index layers influences the light ray paths within the optical substrate as a function of at least one of ray angle or ray position, shifting pupil to mitigate banding effects. In some embodiments, at least one index layer is a GRIN medium. It should be understood that various GRIN mediums may be used in accordance with various embodiments of the invention, such as the examples of various GRIN mediums that are described in U.S. Provisional Patent Application No. 62/123,282 entitled NEAR EYE DISPLAY USING GRADIENT INDEX OPTICS and U.S. Provisional Patent Application No. 62/124,550 entitled WAVEGUIDE DISPLAY USING GRADIENT INDEX OPTICS.

Figure 8:
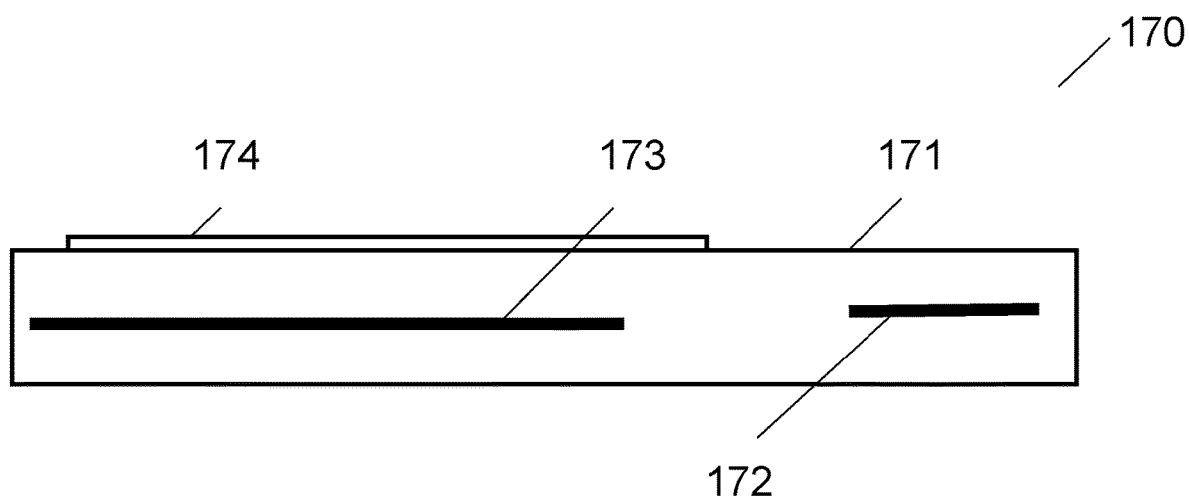
FIG. 8 provides a schematic cross section view of a detail of a waveguide in which a debanding optic is an optical beam modifying layer disposed on a reflecting surface of the waveguide substrate.
Figure 9:
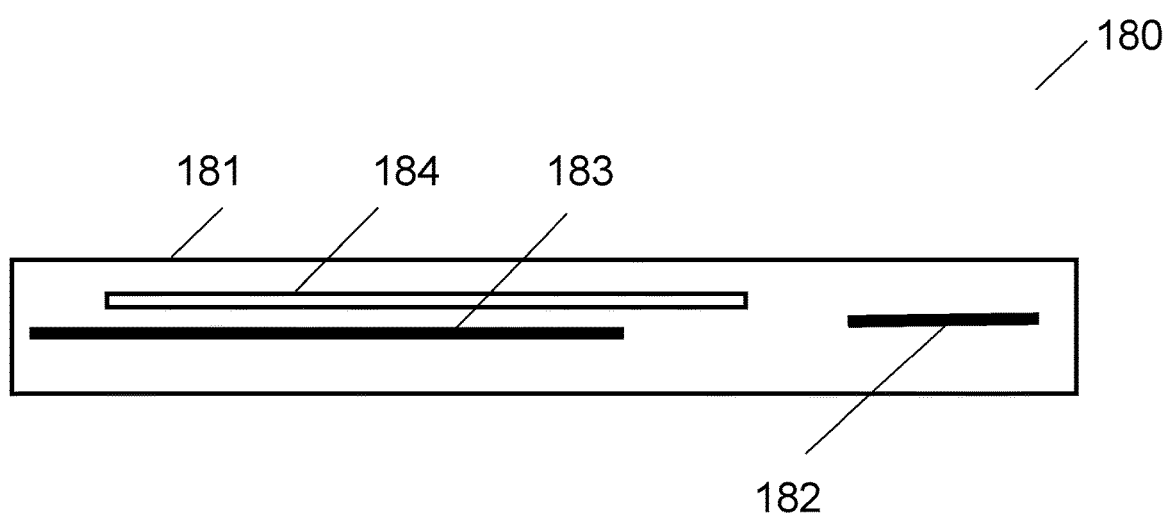
FIG. 9 provides a schematic cross section view of a detail of a waveguide in which a debanding optic is an optical beam modifying layer disposed within the waveguide substrate.

In a number of embodiments, a debanding optic is one or more index layers disposed adjacent to at least one reflecting surface of an edge of an optical substrate such that the one or more layers are configured to provide pupil shifting to eliminate or mitigate banding effects. Depicted in FIG. 8 is an embodiment of a waveguide device (170) having an optical substrate (171) that contains an input grating (172) and an output grating (173) with one or more stacked index layers (174) disposed adjacent an upper reflecting surface of the waveguide such that the one or more index layers provide pupil shifting. In many embodiments, a debanding optic is one or more index layers disposed within an optical substrate such that the one or more layers are configured to provide pupil shifting to eliminate or mitigate banding effects. For example, depicted in FIG. 9 is an embodiment of a waveguide device (180) having an optical substrate (181) that contains an input grating (182) and an output grating (183) with one or more stacked index layers (184) disposed within the optical substrate (181) such that the one or more layers (184) are configured to provide pupil shifting. In some embodiments, a waveguide device incorporates a debanding optic that includes one or more index layers disposed within an optical substrate and one or more index layers also disposed adjacent to at least one reflecting surface of the optical substrate.

Figure 10:
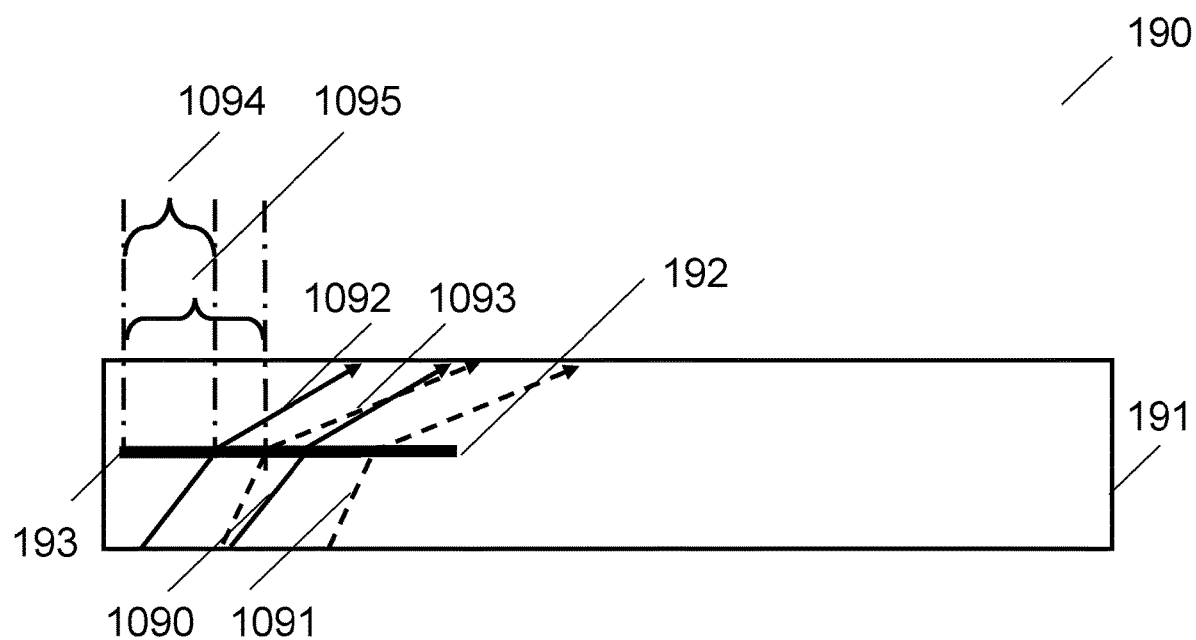
FIG. 10 provides a schematic cross section view of a detail of a waveguide in which a debanding optic is an input grating, varying the separation of an input beam from a leading edge of the input grating as a function of the beam incidence angle in one embodiment.

In several embodiments, a debanding optic is an input grating having a leading edge able to couple incident light such that a unique displacement of a ray bundle of the light relative to the leading edge of the input grating is provided by the input grating for any given incident light direction, shifting pupil to eliminate or mitigate banding effects. Depicted in FIG. 10 is a detail of an embodiment of a waveguide device (190) having an optical substrate (191) that contains an input grating (192) with a leading edge (193). Collimated input ray paths for two different input angles (1090 & 1091) and the corresponding diffracted rays (1092 & 1093) are depicted. Separations of edges of the two ray sets from the leading edge of the input gratings (1094 & 1095) are depicted. In some embodiments, a displacement of light relative to an edge of an input grating of a ray bundle results in a portion of the beam to fall outside the input grating apertures and therefore not being diffracted into a TIR path inside an optical substrate, depending on the field angle of the incoming light. A suitable absorbing film traps non-diffracted light, in accordance with various embodiments. Hence a beam width can be tailored to meet a debanding condition, when a TIR angle U and a waveguide substrate thickness D is given by 2D tan (U), as was described in greater detail in relation to FIG. 2. An example of such an embodiment will be discussed in greater detail in a subsequent section (see FIG. 20).

Figure 11:
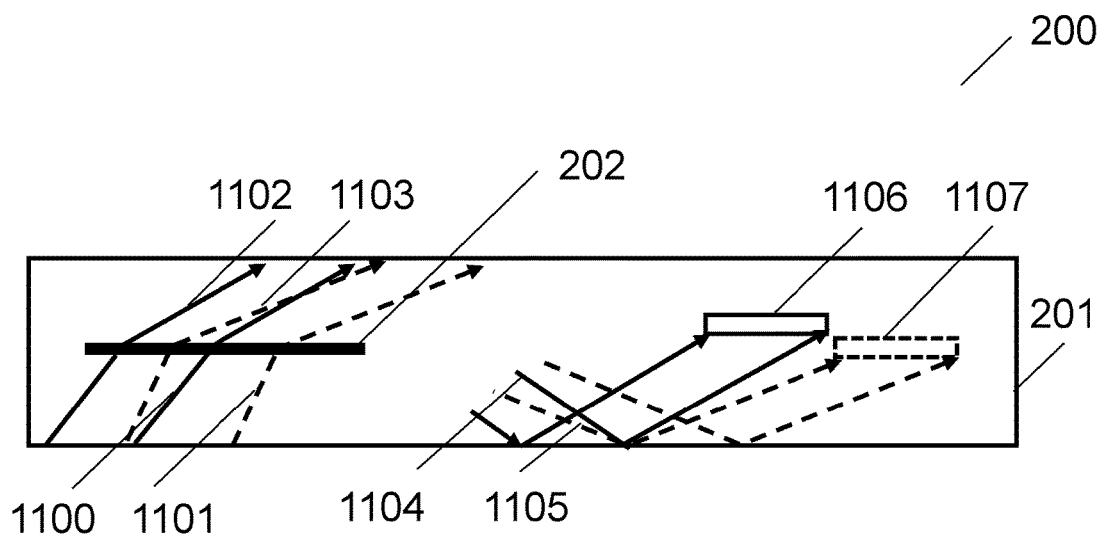
FIG. 11 provides a schematic cross section view of a detail of a waveguide in which a debanding optic provides projected pupils within the waveguide at locations dependent on the beam incidence angle in one embodiment.

In many embodiments, a debanding optic is an input grating configured to have a variation of diffraction efficiencies such that a plurality of collimated incident ray paths of the incident light is diffracted into different TIR ray paths, as determined by a ray path input angle, such that a projected pupil is capable of forming at a unique location within the optical substrate for each of the plurality of collimated incident ray paths to eliminate or mitigate banding effects. Depicted in FIG. 11 is a detail of an embodiment of a waveguide device (200) having an optical substrate (201) that contains an input grating (202). Collimated input ray paths for two different input angles (1100 & 1101) are diffracted by the input grating (202) such that the diffracted rays (1102 & 1103) each follow a TIR path down the optical substrate (201). Each TIR ray path (1104 & 1105) forms a projected pupil (1106 & 1107) in a unique location, based on the incident angle, and such that banding effects are eliminated and/or mitigated.

In some embodiments, a variation of diffraction efficiencies varies along a principal waveguide direction to provide, at least in part, pupil shift to eliminate or mitigate banding effects. In many embodiments, a variation of diffraction efficiencies varies in two dimensions over the aperture of the input grating.

Figure 12:
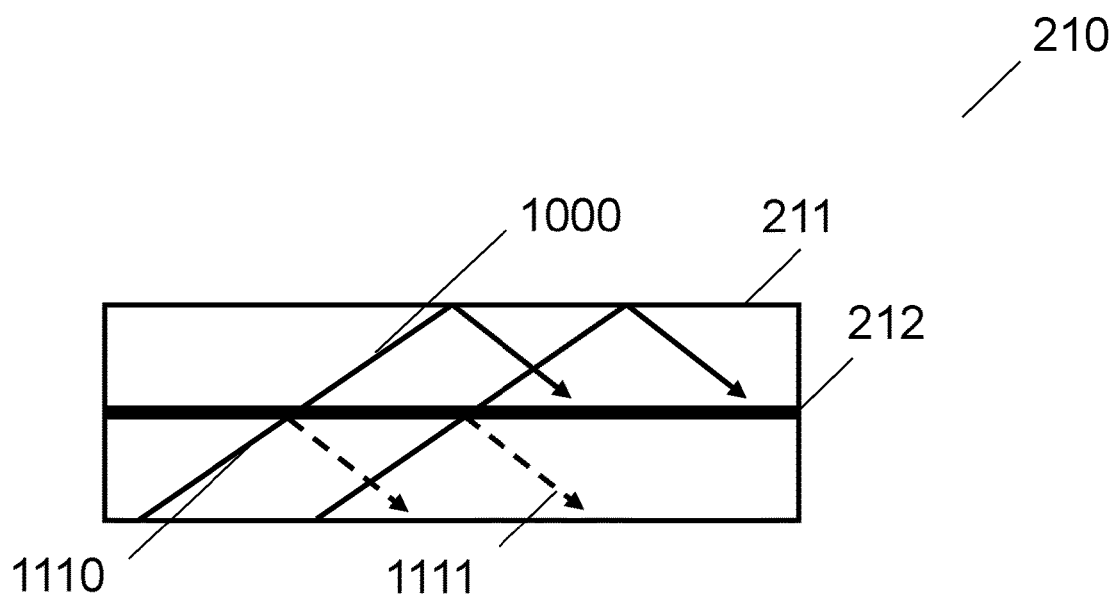
FIG. 12 provides a schematic cross section view of a detail of a waveguide in which a debanding optic is a partially reflecting layer in one embodiment.

In some embodiments, a debanding optic is a partially reflecting layer disposed within an optical substrate such that the partially reflecting layer separates incident light into transmitted and reflected light, shifting pupil to eliminate or mitigate banding effects. Depicted in FIG. 12 is a detail of an embodiment of a waveguide device (210) having an optical substrate (211) that contains a partially reflecting layer (212), capable of separating incident light (1110) into transmitted light (1000) and reflected light (1111). Transmitted and reflected light (1000 & 1111) each follow a TIR path along a waveguide substrate (211), resulting in a pupil shift to eliminate or mitigate banding effects.

Figure 13:
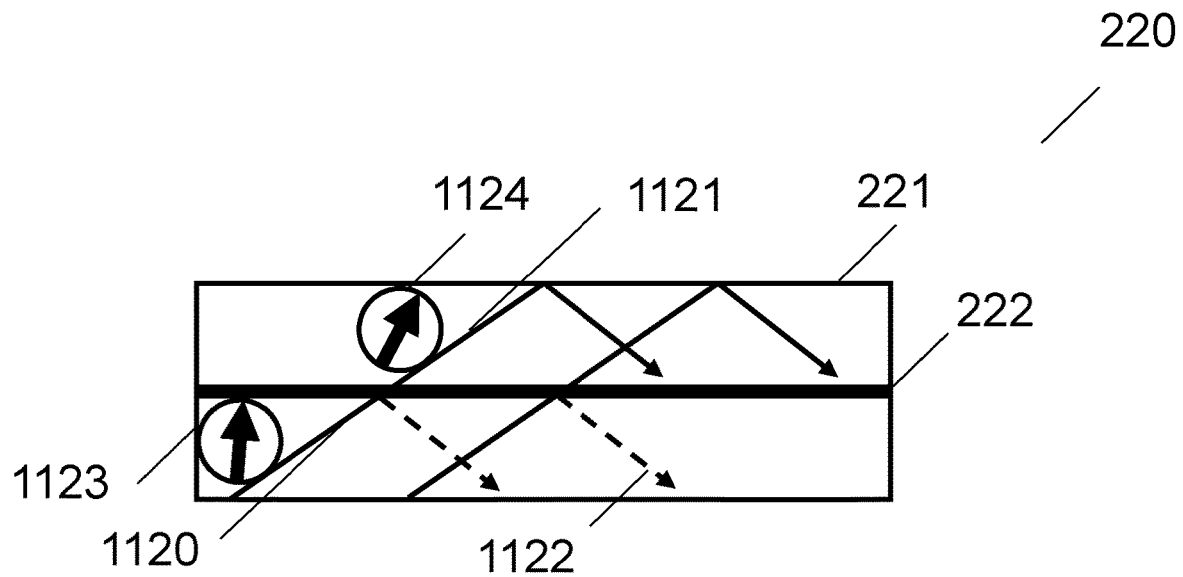
FIG. 13 provides a schematic cross section view of a detail of a waveguide in which a debanding optic is a polarization rotation layer in one embodiment.

In numerous embodiments, a debanding optic is a polarization modifying layer disposed within an optical substrate such that the polarization modifying layer separates incident light into transmitted and reflected light, shifting pupil to eliminate or mitigate banding effects. For example, FIG. 13 provides a detail of an embodiment of a waveguide device (220) having an optical substrate (221) that contains a partially reflecting polarization modifying layer (222), which separates incident light (1120) having a polarization vector (1123) into transmitted light (1121) having a polarization vector (1124), resulting from the retarding effect of a polarization modifying layer (222), and reflected light (1122). Transmitted (1121) and reflected light (1122) follow TIR paths down the optical substrate (221) resulting in a pupil shift to eliminate or mitigate banding effects. In some embodiments, a polarization modifying layer is formed by stretching a polymeric material in at least one dimension. In particular embodiments, a polarization modifying layer is a polymeric material, such as birefringent polyester, polymethylmethacrylate (PMMA), or poly-ethylene terephthalate (PET). Polymeric materials may be used in a single layer or two or more may be combined in a stack.

Figure 14:
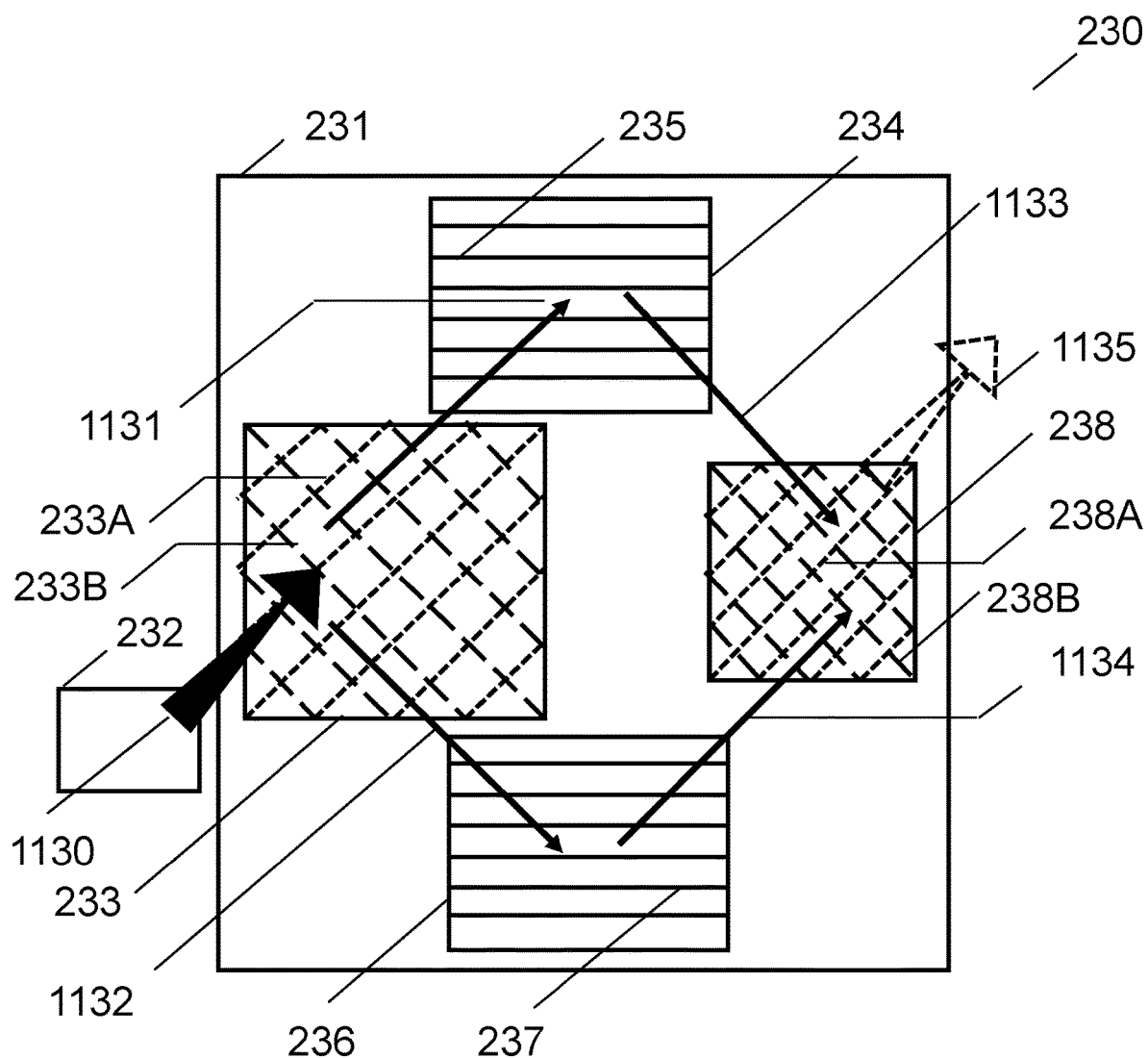
FIG. 14 provides a schematic plan view of a waveguide in which a debanding optic is a grating that provides separated light paths through the waveguide for different polarizations of the input light in one embodiment.

In many embodiments, a debanding optic is at least one grating configured to provide at least two separate waveguide paths which cancel non-uniformity of light of the extracted light for any incidence light angle, eliminating or mitigating banding effects. In several embodiments, a debanding optic includes at least one grating having crossed slant gratings used in conjunction with at least one fold grating exit pupil expander configured to provide a pupil shift to eliminate or mitigate banding effects. Depicted in FIG. 14 is an embodiment of a waveguide device (230) having an optical substrate (231) coupled to an input image generator (232). The optical substrate (231) contains an input grating (233) with crossed slant gratings (233A & 233B), a first fold grating exit pupil expander (234) containing a grating (235), a second fold grating exit pupil expander (236) containing a grating (237), and an output grating (238) with crossed slant gratings (238A & 238B). The input grating (233) receives light from the input image generator (232) in a direction (1130), such that the direction is normal to the surface of the input grating (233). In numerous embodiments, crossed gratings in a grating have a relative angle of approximately ninety degrees in the plane of an optical substrate. It should be noted, however, other angles may be used in practice and still fall within various embodiments of the invention.

In several embodiments, a debanding optic is a system of gratings, such that an input grating and an output grating each combine crossed gratings with peak diffraction efficiency for orthogonal polarizations states. In some embodiments, polarization states created by input and output gratings are S-polarized and P-polarized. In a number of embodiments, polarization states created by input and output gratings are opposing senses of circular polarization. Several embodiments utilize gratings recorded in liquid crystal polymer systems, such as SBGs, which may have an advantage owing to their inherent birefringence and exhibiting strong polarization selectivity. It should be noted, however, that other grating technologies that can be configured to provide unique polarization states may be used and still fall within various embodiments of the invention.

Returning to FIG. 14, a first polarization component of the input light incident on the input grating (233) along a direction (1130) is directed by a grating (233B) into a TIR path along a direction (1131) and a second polarization component is directed by a second grating (233A) into a second TIR path along a direction (1132). Light traveling along the TIR paths (1131 &1132) is expanded in the plane of the optical substrate (231) by fold gratings (234 & 236) and diffracted into second TIR paths (1133 & 1134) towards an output grating (238). Crossed slants (238A & 238B) of the output grating (238) diffract light from the second TIR paths (1133 & 1134) into a uniform output path (1135) such that banding effects are eliminated or mitigated. In some embodiments, a grating prescription is designed to provide dual interaction of guided light with the grating, which may enhance a fold grating angular bandwidth. A number of embodiments of dual interaction fold gratings can be used, such as the gratings described in U.S. patent application Ser. No. 14/620,969 entitled WAVEGUIDE GRATING DEVICE.

Figure 15:
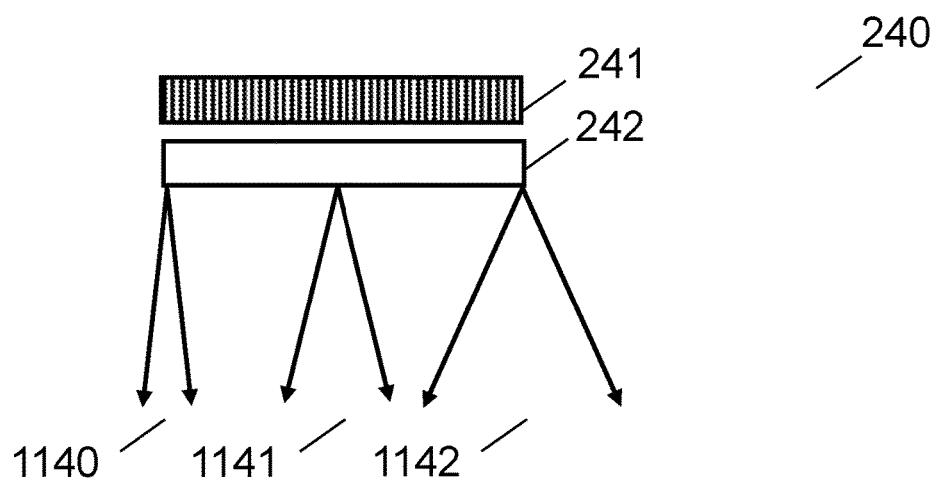
FIG. 15 provides a schematic cross section view of a detail of a microdisplay in which a debanding optic provides a variable numerical aperture across principal directions of a microdisplay panel in one embodiment.

In several embodiments, a debanding optic is an optical component within a microdisplay that provides variable effective numerical apertures (NA) capable of being spatially varied along at least one direction to shift pupil to eliminate or mitigate banding effects. Depicted in FIG. 15 is an embodiment an input image generator (240) designed to have a numerical aperture (NA) variation ranging from high NA on one side of the microdisplay (241) panel varying smoothly to a low NA at the other side to provide a pupil shift. For the purposes of explanation, a NA in relation to a microdisplay is defined herein as being proportional to the sine of the maximum angle of the image ray cone from a point on the microdisplay surface with respect to an axis normal to the microdisplay. As shown in FIG. 15, the NA of the microdisplay (241) is spatially varied by an optical component (242) which causes the NA to vary across at least one principal dimension of the microdisplay as indicated by the extending light rays (1140-1142). It should be understood that an optical component used to vary a NA may be any appropriate optical component, such as any of the optical components described in PCT Application No.: PCT/GB2016000181 entitled WAVEGUIDE DISPLAY. In multiple embodiments, a microelectromechanical systems (MEMS) array is used to spatially vary the (NA) across a microdisplay display panel. In numerous embodiment, a MEMs array spatially varies the NA of light reflected from a microdisplay panel. In many embodiments, a MEMS array utilizes technology used in data projectors.

In several embodiments, a microdisplay is a reflective device. In some embodiments, a microdisplay is a transmission device, such as, for example, a transmission liquid crystal on silicon (LCoS) device. In many embodiments, an input image generator has a transmission microdisplay panel with a backlight and a variable NA component. When a backlight is employed, in accordance with various embodiments, the illuminated light typically has a uniform NA across, illuminating a back surface of a microdisplay, which is propagated through a variable NA component and converted into an output image modulated light with NA angles varying along a principal axis of the microdisplay.

In a number of embodiments, an emissive display is employed in a microdisplay. Examples of emissive displays for use within a microdisplay include, but not limited to, LED arrays and light emitting polymers arrays. In some embodiments, an input image generator incorporates an emissive microdisplay and a spatially-varying NA component. Light from a microdisplay employing an emissive display, in accordance with various embodiments, typically has a uniform NA across the emitting surface of the display, illuminates the spatially-varying NA component and is converted into an output image modulated light with NA angles varying across the display aperture.

Figure 16A:
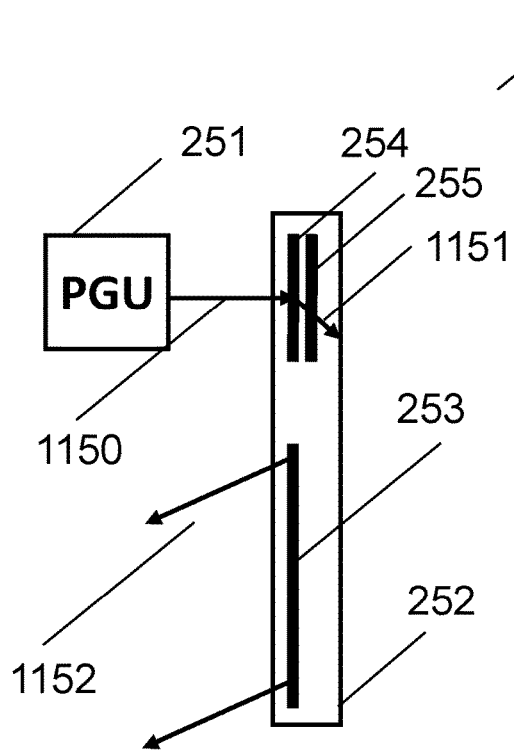
FIG. 16A provides a schematic cross section view of a waveguide using stacked switching input gratings in one embodiment.

In many embodiments, a debanding optic is a plurality of grating layers within at least one grating such that the plurality of grating layers is configured to smear out any fixed pattern noise resulting in pupil shift to eliminate or mitigate banding effects. Depicted in FIG. 16A is an embodiment of a waveguide device (250) having a picture generation unit (PGU) (251), optically coupled to an optical substrate (252) that extracts light via an output grating (253). The optical substrate (252) contains stacked input gratings (254 & 255) and a fold grating that is not illustrated. Input light (1150) from the PGU (251) is coupled into the waveguide substrate (252) by the input gratings (254 & 255), smearing out any fixed pattern noise, and diffracted into TIR paths (1151), and then diffracted into extracted light (1152) by the output grating (253) resulting in a pupil shift to eliminate or mitigate banding effects. In some embodiments, multiple gratings are combined into a multiplexed grating.

Figure 16B:
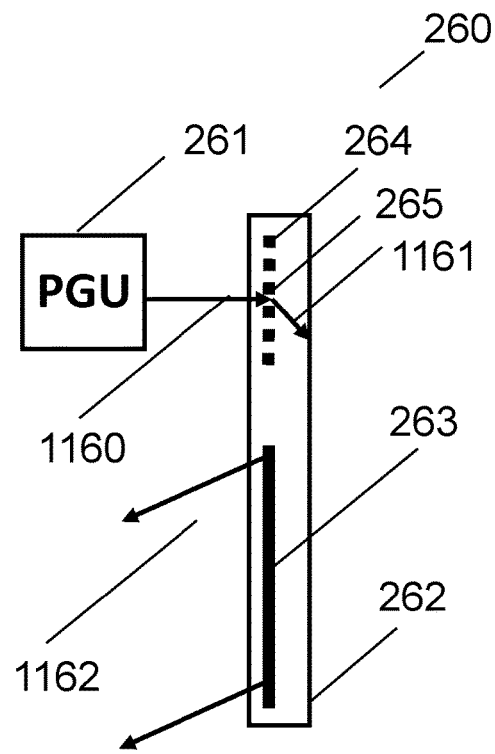
FIG. 16B provides a schematic cross section view of a detail of a waveguide in which a debanding optic is a switchable input grating array in one embodiment.

In several embodiments, a debanding optic is the input grating configured as an array of selectively switchable elements such that configuring the input grating as a switching grating array provides pupil switching in vertical and horizontal directions to shift pupil to eliminate or mitigate banding effects. In many embodiments, individual grating elements are designed to diffract light incident in predefined input beam angular ranges into corresponding TIR angular ranges. Depicted in FIG. 16B is an embodiment of a waveguide device (260) having a PGU (261), optically coupled to an optical substrate (262) that extracts light via an output grating (253). The optical substrate (262) contains a switchable input grating array (264) of selectively switchable elements (265). Input light (1160) is coupled into the optical substrate (262) by the input grating (264), which provides pupil shift in vertical and horizontal directions that is diffracted into TIR paths (1161), and then diffracted into extracted light (1162) by the output grating (263) with banding effects eliminated or mitigated.

Figure 16C:
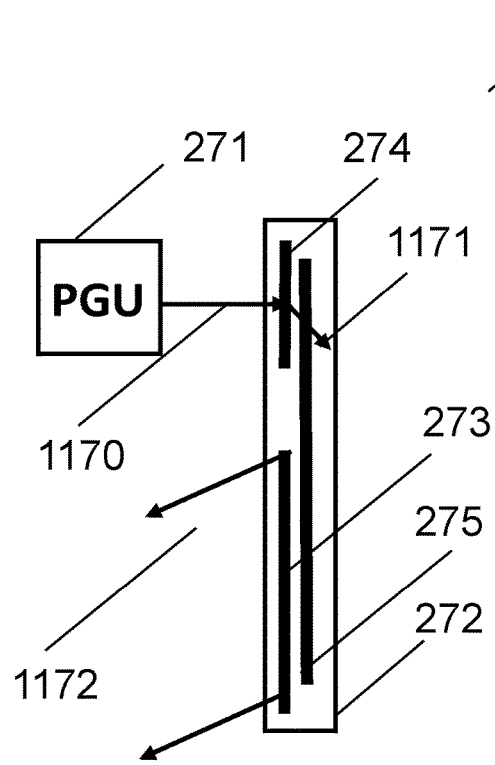
FIG. 16C provides a schematic cross section view of a detail of a waveguide in which a debanding optic is an optical beam modifying layer disposed within the waveguide substrate in one embodiment.

In numerous embodiments, a debanding optic is a plurality of refractive index layers that provide spatial variation along each TIR path of at least one of diffraction efficiency, optical transmission, polarization and birefringence to influence ray paths within a waveguide substrate as a function of at least one of ray angle or ray position within the substrate, resulting in shift of pupil to eliminate or mitigate banding effects. In several embodiments, a plurality of refractive index layers incorporates adhesives of different indices, especially to influence high angle reflections. In some embodiments, a plurality of refractive index layers incorporate layers, such as alignment layers, isotropic refractive layers, GRIN structures, antireflection layers, partially reflecting layer, or birefringent stretched polymer layers. Depicted in FIG. 16C is an embodiment of a waveguide device (270) having a PGU (271) optically coupled to an optical substrate (272) that extracts light via an output grating (273). The optical substrate (272) contains an input grating (274) and at least one refractive index layer (275). Input light (1170) is coupled into the optical substrate (272) by the input grating (275) and diffracted into TIR paths (1171) that pass through the refractive index layer (275) causing spatial variation, and then diffracted into extracted light (1172) by the output grating (273), resulting in a pupil shift to eliminate or mitigate banding effects.

Figure 16D:
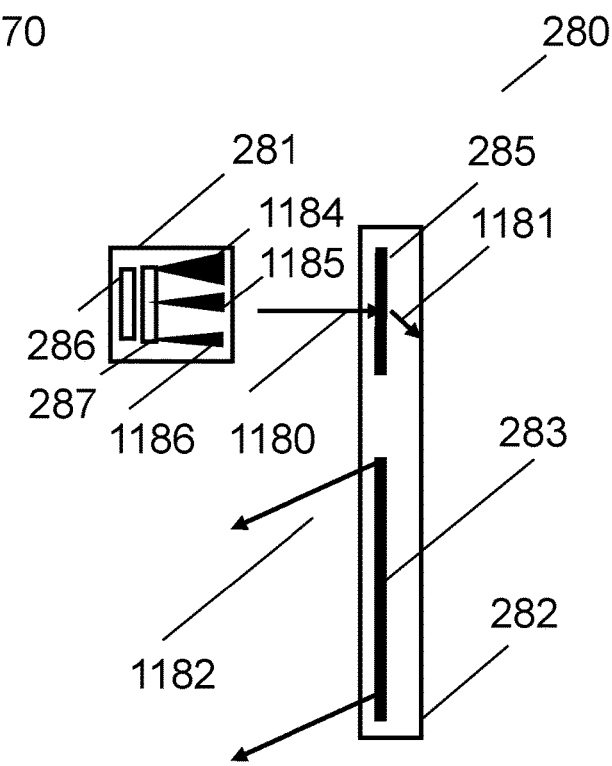
FIG. 16D provides a schematic cross section view of a detail of a waveguide in which a debanding optic is a microdisplay panel that provides a variable numerical aperture across principal directions of in one embodiment.

In some embodiments, a debanding optic is a microdisplay projecting spatially varied NAs that shift pupil to eliminate or mitigate banding effects. In several embodiments, NA can be varied in two orthogonal directions. Depicted in FIG. 16D is an embodiment of a waveguide device (280) having a PGU (281) optically coupled to an optical substrate (282) that extracts light via an output grating (283). The optical substrate (282) contains an input grating (285). Input light (1180) is coupled into the optical substrate (282) by the input grating (285) and diffracted into TIR paths (1181), and then diffracted into extracted light (1182) by the output grating (283). The PGU (281) has a microdisplay (286) overlaid by an NA modification layer (287) capable of spatially varying NA and modifying the light into varying beam profiles (1184-1186), resulting in pupil shift to eliminate or mitigate banding effects. In accordance with various embodiments, a PGU also incorporates other components, such as a projection lens and/or beamsplitter, for example.

In many embodiments, a debanding optic is a tilted microdisplay configured to project a tilted, rectangular exit pupil such that the cross section of the exit pupil varies with a field angle, such that banding effects are eliminated or mitigated. In a number of embodiments, an exit pupil changes position on an input grating. This technique, in accordance with various embodiments, can be used to address banding in one beam expansion axis. Depicted in FIG. 16E is an embodiment of a waveguide device (290) having a PGU (291) optically coupled to an optical substrate (292) which extracts light via an output grating (293). Input light (1190) emerging from the tilted PGU exit pupil (295) is coupled into the waveguide via an input grating (294) and diffracted into TIR paths (1191), and then diffracted into extracted light (1192) by the output grating (293), eliminating or mitigating banding effects.

In several embodiments, a debanding optic is a tilted microdisplay configured to angle light rays to form various projected pupils at different positions along an optical substrate for each direction of incident light, such that banding effects are mitigated along one expansion axis. Depicted in FIG. 16F is an embodiment of a waveguide device (300) having a PGU (301) optically coupled to an optical substrate (302), which extracts light via an output grating (303). Input light (1200) emerging from the tilted PGU exit pupil (305) is coupled into the waveguide by an input grating (304) and diffracted into TIR paths (1201). The guided light forms beam angle-dependent projected pupils (1203-1205) at different positions along the substrate (302) for each direction of incident light, and then diffracted into extracted light (1202) by the output grating (303), eliminating or mitigating banding effects.

In numerous embodiments, a debanding optic is a prism coupled to an optical substrate, such that a linear relationship between the angles of an exit pupil from a light source and the TIR angles in the optical substrate result in no gaps between successive light extractions along the TIR ray path, which occurs when the TIR path angle is U as defined by 2D tan (U). In many embodiments, an input grating is replaced with a coupling prism. In several embodiments, input light is provided through a tilted PGU pupil. By selecting a prism angle and cooperative PGU pupil tilt, in accordance with various embodiments, it is possible to achieve an approximately linear relationship between the angles out of the PGU exit pupil and the TIR angles in the waveguide while meeting a debanding condition when the effective input aperture for a TIR angle U and a waveguide substrate thickness D is given by 2D tan (U), over the entire field of view range. Depicted in FIG. 16 G is an embodiment of a waveguide device (310) having a PGU (311) optically coupled to an optical substrate (312), which extracts light via an output grating (313). Input light (1210) emerging from a tilted PGU exit pupil (315) is coupled into the optical substrate (312) by a prism (314) resulting in TIR paths (1211) and then diffracted into extracted light (1192) by the output grating (293), eliminating or mitigating banding effects. In some embodiments, color dispersion due to the prism is compensated by a diffractive surface. In many embodiments, a prism coupler has refracting surface apertures designed to shape the light as a function of angle. Light at the edges of the beam that is not transmitted through the prism into the waveguide is eliminated from the main light path by baffling or light absorbing coatings, in accordance with a number of embodiments.

In some embodiments, a debanding optic is a light-absorbing film adjacent to the edges of an optical substrate such that portions of incident light, that would otherwise give rise to banding, are removed, eliminating or mitigating banding effects. Depicted in FIG. 16H is an embodiment of a waveguide device (320) designed for beam shifting along one axis of beam expansion. The waveguide device has a PGU (321) coupled to a waveguide (322) containing an output grating (323) and an input grating (324), a substrate (325) having a light-absorbing film (326) applied to one of its edges, a substrate (327) having a light-absorbing film (328) applied to one its edges, the substrates (325 & 327) sandwiching the portion of the waveguide (322) that contains the input grating. The input ray at the upper limit of the input beam (1221) is diffracted by the input grating (324) into a TIR path (1223) and absorbed by the light-absorbing film (326) applied to the substrate (325), eliminating or mitigating banding effects. An input ray at the lower limit of the input beam (1222) is diffracted by the input grating (32)

into a TIR path (1224) and absorbed by the light-absorbing film (328) applied to the substrate (327), eliminating or mitigating banding effects. An input ray near the central portion of the input beam (1220) is diffracted by the input grating (324) into a TIR path (1225) which does not interact with either of the light-absorbing films (326 & 328) and continues to propagate under TIR until it is extracted by the output grating (323) into the output beam (1226).

Figure 17:
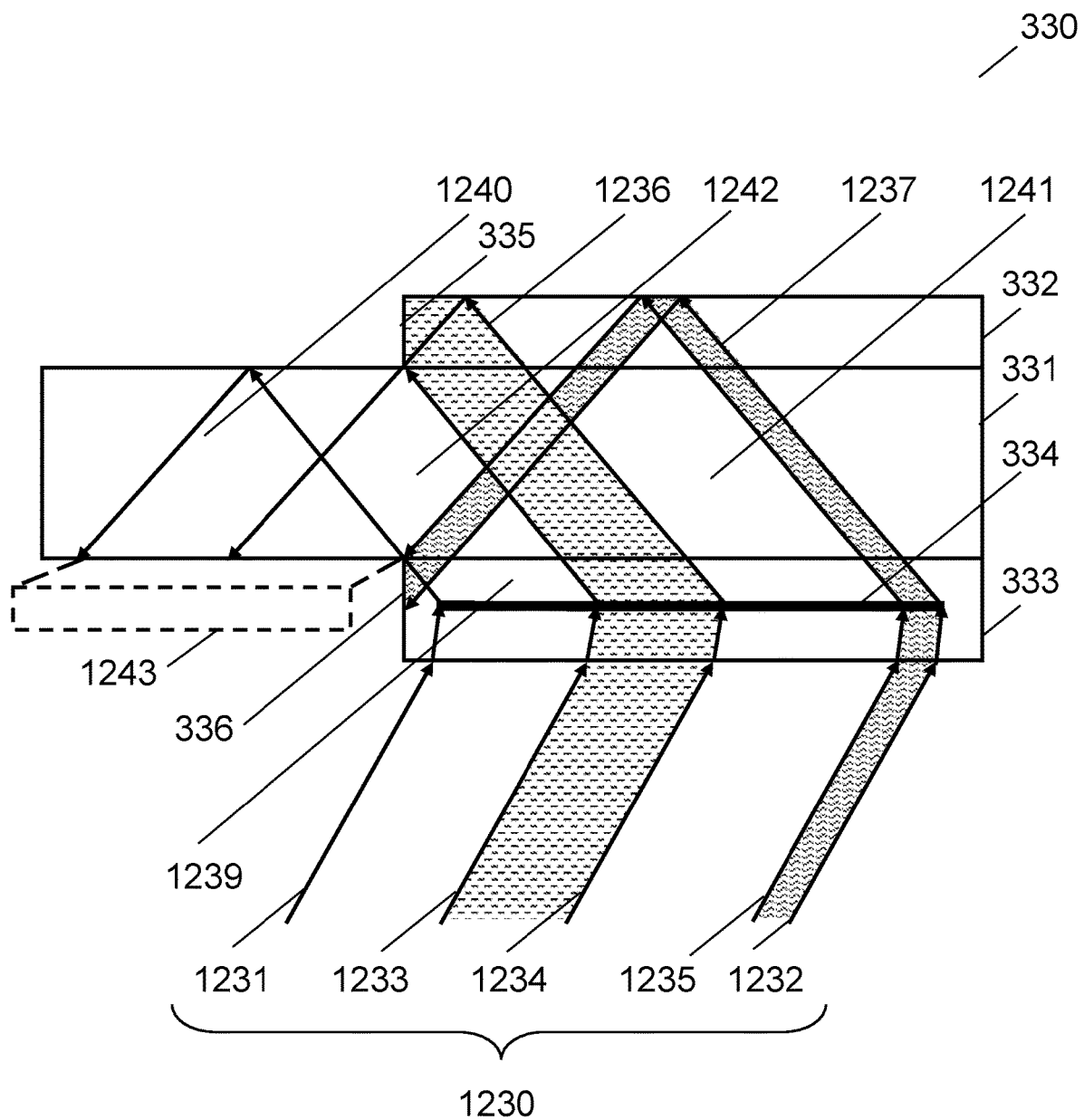
FIG. 17 provides a schematic cross section view of a detail of a waveguide in which a debanding optic is a plurality of additional substrates having light absorbing edges in one embodiment.

In many embodiments, a debanding optic is a first light-absorbing film disposed adjacent to the edges an input substrate containing an input grating and disposed adjacent to an optical substrate, and a second light-absorbing film disposed adjacent to the edges a second substrate, attached adjacent to the optical substrate opposite the input substrate, such that incident light results in no gaps between successive light extractions along the TIR ray path, which occurs when the TIR path angle is U as defined by 2D tan (U). Depicted in FIG. 17 is an embodiment of a waveguide device (330) configured such that an input grating (334) is disposed within an input substrate (333), which together with the substrate (332) sandwiches a waveguide (331). The cross section of an input beam for a given field of view direction (1230) with peripheral rays (1231 & 1232) enters into the input grating (334). An input beam portion bounded by rays (1233 & 1234) is diffracted into a beam path (1236) and intercepted by an absorbing film (335) applied to the edge of the upper substrate (332). The input beam portion bounded by rays (1232 & 1235) is diffracted into the beam path (1237) undergoes TIR at the outer surface of the upper substrate (332) and intercepted by an absorbing film (336) applied to the input substrate edge. The input beam portions bounded by rays (1231 & 1233) and (1234 & 1235) are diffracted into respective TIR paths (1239 &1240) and (1241 & 1242) which exhibit no gap or overlap in the beam cross section region (1243) and at all beam cross sections thereafter, thereby eliminating banding utilizing a TIR angle U and a waveguide substrate thickness D is given by 2D tan (U). In some particular embodiments, the thickness of a waveguide is 3.4 mm, the thickness of an upper substrate 0.5 mm, and a lower substrate contains two 0.5 mm thick glass substrates sandwiching an input grating. Based on this geometry and the debanding condition of a TIR angle U and a waveguide substrate thickness D is given by 2D tan (U), the throughput efficiency is estimated to be roughly 1−2*0.5/(2*3.4)=84% with some small variation across the field of view.

In some embodiments utilizing an input substrate, an input grating is implemented in separate cells bonded to the main waveguide, thus simplifying indium tin oxide (ITO) coating. In many embodiments utilizing an input substrate, beam shifting techniques based on forming a projected stop and tilting the PGU exit pupil are incorporated, to provide debanding in orthogonal directions.

Figure 18:
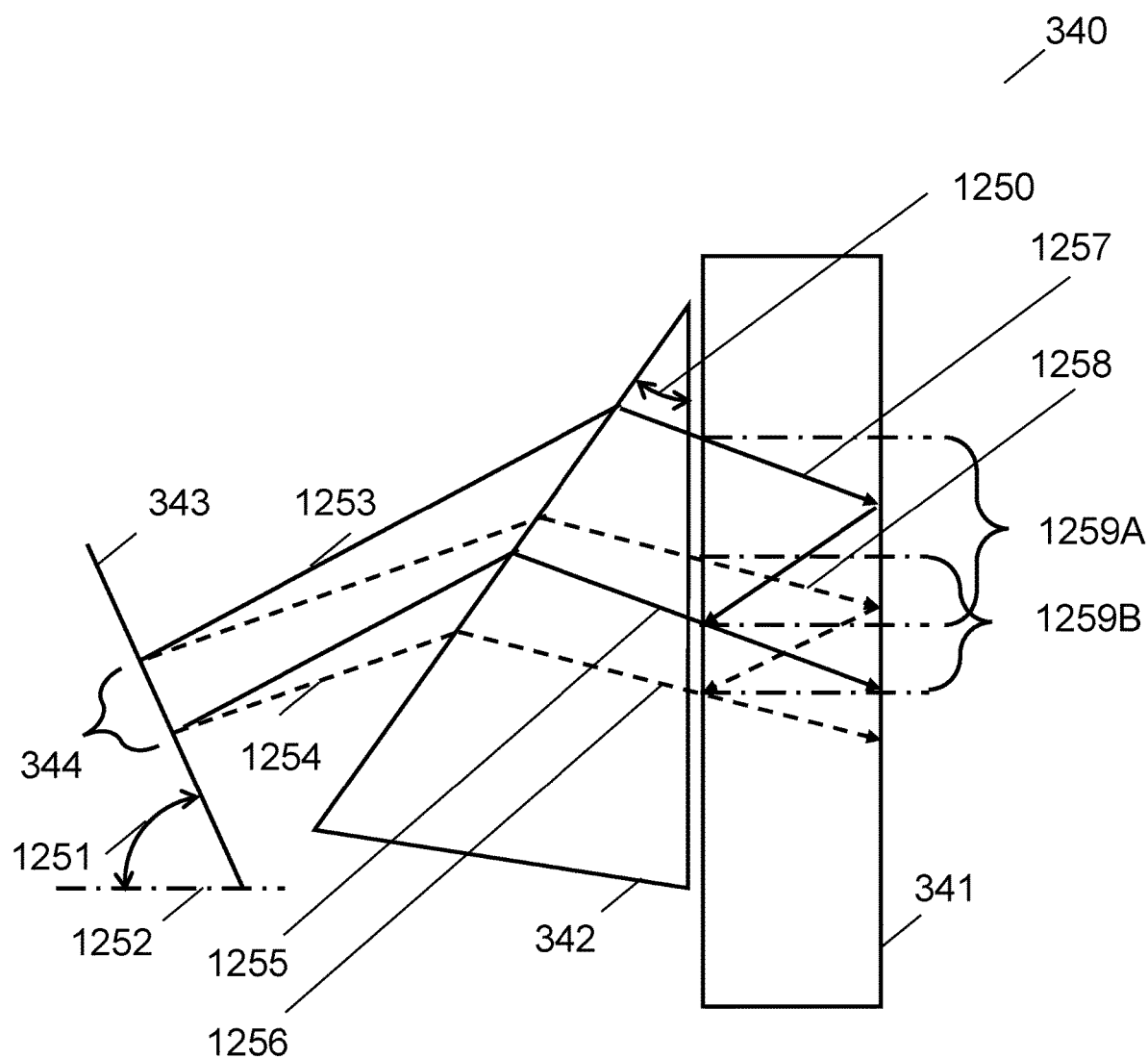
FIG. 18 provides a schematic cross section view of a detail of a waveguide in which a debanding optic is a tilted input image generator and a coupling prism in one embodiment.

Depicted in FIG. 18 is a detail of an embodiment of a waveguide device 340 having a waveguide portion (341), a prism (342) with two refracting faces inclined at a relative angle (1250) and an exit pupil (343) of a PGU (not pictured), the exit pupil (343) tilted at an angle (1251) relative to a reference axis (1252).

In some embodiments, a prism is separated from a waveguide by a small air gap. In many embodiments, a prism is separated from a waveguide by a thin layer of low index material.

Returning to FIG. 18, light beams (1253 & 1254) from the exit pupil (343) correspond to two different field angles refracted through the prism (342) as beams (1255 & 1256) and are then coupled into the TIR paths (1257 & 1258) inside the waveguide (341). The beam widths at the waveguide surface adjacent the prism (1259A & 1259B) are depicted. By choosing suitable values for the prism angle, PGU exit pupil tilt angle, prism index, waveguide index and waveguide thickness, utilizing a TIR angle U and a waveguide substrate thickness D is given by 2D tan (U), light is debanded for all field angles while at the same time providing an approximately linear relationship between the field angle at the PGU exit pupil and the TIR angle within the waveguide for any ray in the field of view.

In a number of embodiments incorporating color waveguides, projected stops are required to be created in different waveguides, each on a different plane, such that the waveguides form a stack. Misalignment of these stops leads to misregistration of the color components of the output images from the waveguide and hence color banding. One solution, in accordance with various embodiments, is a waveguide input stop with outer dichroic portions to provide some compensation for the color banding and an inner phase compensation coating (e.g., $SiO_2$) to compensate for the phase shift due to the input stop. In some embodiments, a waveguide input stop has outer dichroic portions, but lacks a phase compensation coating. A waveguide input stop, in accordance with several embodiments, is formed on a thin transparent plate adjacent to an input surface of the waveguide, overlapping an input grating. In multiple embodiments, a waveguide input stop is disposed within a layer inside a grating. In many embodiments, a waveguide input stop is disposed directly adjacent to a waveguide external surface.

Figure 19:
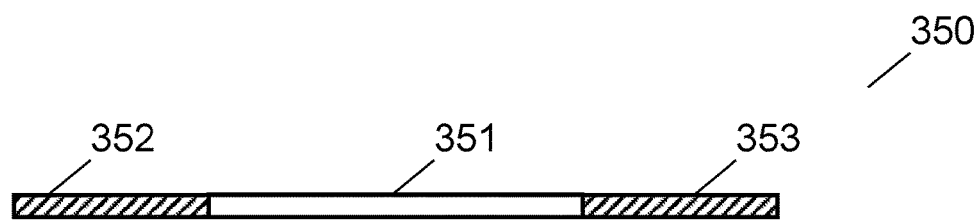
FIG. 19 provides a schematic cross section of a coating structure for use in balancing color registration in color display in one embodiment.

When pupils project at different positions along an optical substrate, in accordance with various embodiments, color display application projected stops are created in different planes inside separate red, green and blue transmitting optical substrate layers. In some embodiments, a waveguide input stop includes outer dichroic portions to shift pupil and eliminate or mitigate color banding and an inner phase compensation coating in inner portions to compensate for the phase shift. In many embodiments, an inner phase compensation coating is $SiO_2$. Depicted in FIG. 19 is an embodiment of a waveguide input stop (350) having outer dichroic portions (352 & 353) and inner phase compensation $SiO_2$ coating (351) to shift pupil and eliminate or mitigate color banding.

Figure 20:
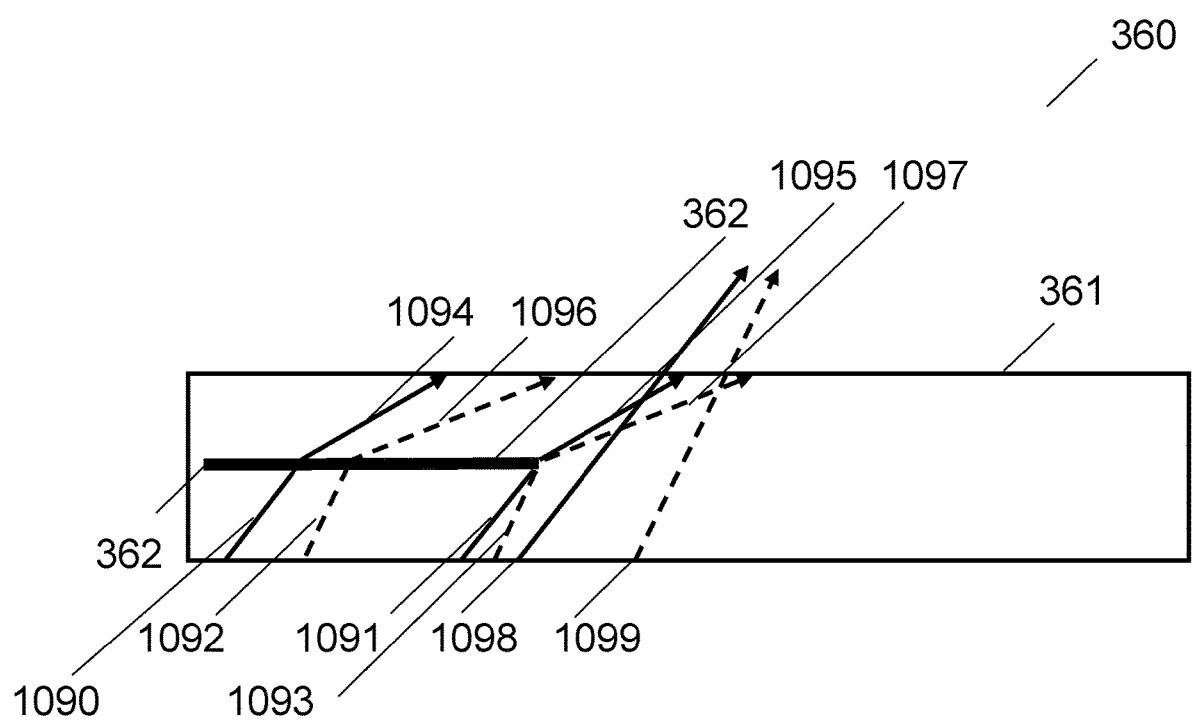
FIG. 20 provides a schematic cross section view of a detail of a waveguide in which a debanding optic is an input grating offsetting the input beam cross section from its edge.

In numerous embodiments, a debanding optic is an input grating configured such that light has a unique displacement relative to an edge of the input grating at any given incident light direction to shift pupil, eliminating or mitigating a banding effect. Displacement of the light results in a portion of the light beam to fall outside the input grating apertures and therefore not being diffracted into a TIR path inside a waveguide, which varies with field angle. In several embodiments, non-diffracted light can be trapped by a suitable absorbing film. In many embodiments, a beam width can be tailored by displacement to meet the debanding condition a TIR angle U and a waveguide substrate thickness D is given by 2D tan (U). Depicted in FIG. 20 is a detail of an embodiment of a waveguide device (360) having an optical substrate (361), which contains an input grating (362). Collimated input ray paths (1090 & 1091) and (1092 & 1093) for two different input angles are diffracted into rays (1094 & 1095) and (1096 & 1097). For each input beam angle, a portion of the input beam misses the input grating (362) and passes undeviated through the waveguide substrate (361) as exiting rays (1098 and 1099) from each beam. In many embodiments, a light absorbing film applied to the waveguide surface traps non-diffracted light It should be understood, that the various embodiments of debanding described herein, can be combined. In several embodiments, embodiments for debanding can be combined with a technique to vary the diffraction efficiency of the input grating along a principal waveguide direction. Furthermore, in many embodiments, embodiments of debanding are performed in each beam expansion direction. Accordingly, in some embodiments, two or more of embodiments employing debanding solutions are combined to provide debanding in two dimensions. In a number of embodiments in which a waveguide device operates in two dimensions, the device includes fold gratings, which allow for debanding in two dimensions.

In a number of embodiments, a waveguide display is integrated within a window, for example, a windscreen-integrated HUD for road vehicle applications. It should be understood that any appropriate window-integrated display may be integrated into a waveguide display and fall within various embodiments of the invention. Examples of window-integrated displays are described in U.S. Provisional Patent Application No. 62/125,064 entitled OPTICAL WAVEGUIDE DISPLAYS FOR INTEGRATION Ind. WINDOWS and U.S. Provisional Patent Application No. 62/125,066 entitled OPTICAL WAVEGUIDE DISPLAYS FOR INTEGRATION Ind. WINDOWS.

In many embodiments, a waveguide display includes gradient index (GRIN) wave-guiding components for relaying image content between an input image generator and the waveguide. Exemplary GRIN wave-guiding components are described in U.S. Provisional Patent Application No. 62/123,282 entitled NEAR EYE DISPLAY USING GRADIENT INDEX OPTICS and U.S. Provisional Patent Application No. 62/124,550 entitled WAVEGUIDE DISPLAY USING GRADIENT INDEX OPTICS. In several embodiments, a waveguide display incorporates a light pipe for providing beam expansion in one direction. Examples of light pipes are described in U.S. Provisional Patent Application No. 62/177,494 entitled WAVEGUIDE DEVICE INCORPORATING A LIGHT PIPE. In some embodiments, the input image generator may be based on a laser scanner as disclosed in U.S. Pat. No. 9,075,184 entitled COMPACT EDGE ILLUMINATED DIFFRACTIVE DISPLAY. Various embodiments of the invention are used in wide range of displays, including (but not limited t) HMDs for AR and VR, helmet mounted displays, projection displays, heads up displays (HUDs), Heads Down Displays, (HDDs), autostereoscopic displays and other 3D displays. A number of the embodiments are applied in waveguide sensors such as, for example, eye trackers, fingerprint scanners, LIDAR systems, illuminators and backlights.

In some embodiments, a waveguide device incorporates an eye tracker. It should be understood that a number of eye trackers can be used and still fall within various embodiments of the invention, including eye trackers described in PCT/GB2014/000197 entitled HOLOGRAPHIC WAVEGUIDE EYE TRACKER, PCT/GB2015/000274 entitled HOLOGRAPHIC WAVEGUIDE OPTICALTRACKER, and PCT Application No.:GB2013/000210 entitled APPARATUS FOR EYE TRACKING.

It should be emphasized that the drawings are exemplary and that the dimensions have been exaggerated. For example, thicknesses of the SBG layers have been greatly exaggerated. Optical devices based on any of the above-described embodiments may be implemented using plastic substrates using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. In some embodiments, the dual expansion waveguide display may be curved.

The construction and arrangement of the systems and methods as shown in the various exemplary embodiments are illustrative only. Although only a few embodiments have been described in detail in this disclosure, many modifications are possible (for example, variations in sizes, dimensions, structures, shapes and proportions of the various elements, values of parameters, mounting arrangements, use of materials, colors, orientations, etc.). For example, positions of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

DOCTRINE OF EQUIVALENTS

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at an input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic provides an effective input aperture W such that when the optical substrate has a thickness D, the effective input aperture W is configured to provide a TIR angle U in the optical substrate, and wherein the TIR angle U, the effective input aperture W, and the thickness D are related by $W = 2D \tan(U)$.

2. The waveguide device of claim 1, wherein the extracted light has a spatial non-uniformity less than one of either 10% or 20%.

3. The waveguide device of claim 1, wherein the debanding optic provides spatial variation of the light along the TIR path of at least one of diffraction efficiency, optical transmission, polarization, or birefringence.

4. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at an input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic is at least one grating selected from at least one input grating and at least one output grating, and wherein the selected at least one grating is configured as one or more index layers disposed within the optical substrate such that the one or more index layers influences the light ray paths within the optical substrate as a function of at least one of ray angle or ray position, shifting the illuminated pupil to mitigate banding effects.

5. The waveguide device of claim 1, further comprising at least one reflecting surface on at least a part of an edge of the optical substrate, and wherein the debanding optic comprises one or more index layers disposed adjacent to the at least one reflecting surface such that the one or more index layers are configured to perform a pupil shift to mitigate banding effects.

6. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at an input grating;
at least one light extractor for extracting the light from the optical substrate; and a debanding optic capable of mitigating banding effects of an illuminated pupil, such that the extracted light is a substantially flat illumination profile having mitigated banding, wherein the debanding optic comprises one or more index layers disposed within the optical substrate such that the one or more index layers are configured to perform a pupil shift to mitigate banding effects.

7. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at the input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic comprises a plurality of refractive index layers that provide spatial variation along each TIR path of at least one of diffraction efficiency, optical transmission, polarization, or birefringence to influence ray paths within the optical substrate as a function of at least one of ray angle or ray position within the optical substrate, resulting in a shift of pupil to mitigate banding effects.

8. The waveguide device of claim 1, wherein the debanding optic comprises at least one selected from the group consisting of:
at least one grating selected from at least one input grating and at least one output grating, and wherein the selected at least one grating is configured to provide at least two separate waveguide paths which cancel non-uniformity of light of the extracted light for any incidence light angle, mitigating banding effects;
at least one grating selected from at least one input grating and at least one output grating, and wherein the selected at least one grating is configured to provide at least two separate waveguide paths which cancel non-uniformity of light of the extracted light for any incidence light angle, mitigating banding effects, wherein the selected grating has crossed slant gratings used in conjunction with at least one fold grating exit pupil expander;
an optical component within a microdisplay that provides variable effective numerical apertures (NA) capable of being spatially varied along at least one direction to shift pupil shift to mitigate banding effects;
a plurality of grating layers within at least one grating of either at least one input grating or at least one output grating such that the plurality of grating layers is configured to smear out any fixed pattern noise resulting in shift of pupil to mitigate banding effects; and
an input grating configured as an array of selectively switchable elements such that configuring the input grating as a switching grating array provides pupil switching in vertical and horizontal directions to shift pupil to mitigate banding effects.

9. The waveguide device of claim 1, wherein the debanding optic comprises at least one selected from the group consisting of:
a microdisplay projecting spatially varied numerical apertures that shift pupil to mitigate banding effects;
a tilted microdisplay configured to project a tilted, rectangular exit pupil such that the cross section of the exit pupil varies with a field angle, such that banding effects are mitigated;
a tilted microdisplay configured to angle light rays to form various projected pupils at different positions along the optical substrate for each angle of incident light, such that banding effects are mitigated along one expansion axis;
a light-absorbing film adjacent to the edges of the optical substrate such that portions of the incident light, that would otherwise give rise to banding, are removed, mitigating banding effects; and
an input grating configured such that the light has a unique displacement relative to an edge of the input grating at any given incident light direction to shift pupil, eliminating or mitigating a banding effect.

10. The waveguide device of claim 1, wherein the optical substrate has a thickness D, and wherein the debanding optic comprises at least one selected from the group consisting of:
a prism coupled to the optical substrate, such that a linear relationship between the angles of an exit pupil from the light source and the TIR angles in the optical substrate result in no gaps between successive light extractions along the TIR ray path, which occurs when the TIR path angle is U as defined by 2D tan (U);
a first light-absorbing film disposed adjacent to the edges an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path, which occurs when the TIR path angle is U as defined by 2D tan (U); and a first light-absorbing film disposed adjacent to the edges an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path, which occurs when the TIR path angle is U as defined by 2D tan (U), wherein the thickness of the optical substrate is 3.4 mm, the thickness of the second is substrate 0.5 mm, and the input substrate contains two 0.5 mm thick glass substrates sandwiching the input grating.

11. The waveguide device of claim 1, wherein the device is integrated into a display selected from the group of head mounted display (HMD) and a head up display (HUD).

12. The waveguide device of claim 11, wherein at least one of the following: a human eye is positioned with an exit pupil of the display; and the device incorporates an eye tracker.

13. The waveguide device of claim 1 further comprising an input image generator that further comprises the light source, a microdisplay panel, and optics for collimating the light.

14. The waveguide device of claim 1, wherein the light source is selected from the group of: at least one laser, and at least one light emitting diode (LED).

15. The waveguide device of claim 1, wherein the light coupler is selected from the group of an input grating; and a prism.

16. The waveguide device of claim 1, wherein the light extractor is an output grating.

17. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises an effective input aperture W such that the optical substrate has a thickness D, the effective input aperture W is configured to provide a TIR angle U in the optical substrate, and wherein the TIR angle U, the effective input aperture W, and the thickness D are related by W=2D tan (U).

18. The method of claim 17, wherein the output illumination has a spatial non-uniformity less than one of either 10% or 20%.

19. The method of claim 17, wherein the debanding optic provides spatial variation of the TIR light along the TIR path of at least one of diffraction efficiency, optical transmission, polarization, or birefringence.

20. The method of claim 17, wherein the waveguide device further comprises at least one reflecting surface on at least a part of an edge of the optical substrate, and wherein the debanding optic further comprises one or more index layers disposed adjacent to the at least one reflecting surface such that the one or more index layers are configured to shift pupil to mitigate banding effects.

21. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises
one or more index layers disposed within the optical substrate such that the one or more index layers are configured to perform a pupil shift to mitigate banding effects.

22. The method of claim 17, wherein the optical substrate has a configuration selected from the group consisting of:
wherein the debanding optic further comprises a prism coupled to the optical substrate, such that a linear relationship between the angles of an exit pupil from the light source and the TIR angles in the optical substrate result in no gaps between successive light extractions along the TIR ray path;
and wherein the debanding optic further comprises a first light-absorbing film disposed adjacent to the edges of an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path; and
wherein the debanding optic further comprises a first light-absorbing film disposed adjacent to the edges of an input substrate containing an input grating and disposed adjacent to the optical substrate, and a second light-absorbing film disposed adjacent to the edges a second substrate, attached adjacent to the optical substrate opposite the input substrate, such that incident light results in no gaps between successive light extractions along the TIR ray path, and wherein the thickness of the optical substrate is 3.4 mm, the thickness of the second is substrate 0.5 mm, and the input substrate contains two 0.5 mm thick glass substrates sandwiching the input grating.

23. The method of claim 17, wherein the method is performed by a display selected from the group of head mounted display (HMD) and a head up display (HUD).

24. The method of claim 23, wherein at least one of: a human eye is positioned with an exit pupil of the display and the display incorporates an eye tracker.

25. The method of claim 17, wherein the waveguide device further comprises an input image generator that further comprises the light source, a microdisplay panel, and optics for collimating the light.

26. The method of claim 17, wherein the light source is selected from the group of: at least one laser; and at least one light emitting diode (LED).

27. The method of claim 17, wherein the light coupler is selected from one of: an input grating; and a prism.

28. The method of claim 17, wherein the light extractor is an output grating.

29. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at the input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic is at least one grating selected from at least one input grating and at least one output grating, and wherein the selected at least one grating is configured as one or more index layers disposed within the optical substrate such that the one or more index layers influences the light ray paths within the optical substrate as a function of at least one of ray angle or ray position, shifting pupil to mitigate banding effects, and wherein at least one index layer of the one or more index layers is a gradient index (GRIN) medium.

30. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at the input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic comprises a plurality of refractive index layers that provide spatial variation along each TIR path of at least one of diffraction efficiency, optical transmission, polarization, or birefringence to influence ray paths within the optical substrate as a function of at least one of ray angle or ray position within the optical substrate, resulting in shift of pupil to mitigate banding effects, and wherein the plurality of refractive index layers incorporates adhesives of different indices.

31. A waveguide device comprising:
at least one optical substrate;
at least one light source;
at least one light coupler capable of coupling incident light from the light source with an angular bandwidth into a total internal reflection (TIR) within the at least one optical substrate such that a unique TIR angle is defined by each light incidence angle as determined at the input grating;
at least one light extractor for extracting the light from the optical substrate; and
a debanding optic capable of mitigating banding effects of an illuminated pupil, such that the extracted light is a substantially flat illumination profile having mitigated banding, wherein the debanding optic comprises a plurality of refractive index layers that provide spatial variation along each TIR path of at least one of diffraction efficiency, optical transmission, polarization, or birefringence to influence ray paths within the optical substrate as a function of at least one of ray angle or ray position within the optical substrate, resulting in shift of pupil to mitigate banding effects, and wherein the plurality of refractive index layers incorporates layers selected from the group consisting of alignment layers, isotropic refractive layers, GRIN structures, antireflection layers, partially reflecting layer, and birefringent stretched polymer layers.

32. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises one or more index layers disposed within the optical substrate such that the one or more index layers influences the light ray paths within the optical substrate as a function of at least one of ray angle or ray position, resulting in a shift of pupil to mitigate banding effects.

33. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises one or more index layers disposed within the optical substrate such that the one or more index layers influences the light ray paths within the optical substrate as a function of at least one of ray angle or ray position, resulting in a shift of pupil to mitigate banding effects, wherein at least one index layer of the one or more index layers is a gradient index (GRIN) medium.

34. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises a plurality of refractive index layers that provide spatial variation along each TIR path of at least one of diffraction efficiency, optical transmission, polarization, or birefringence to influence ray paths within a waveguide substrate as a function of at least one of ray angle or ray position within the substrate, resulting in shift of pupil to mitigate banding effects.

35. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises a plurality of refractive index layers that provide spatial variation along each TIR path of at least one of diffraction efficiency, optical transmission, polarization, or birefringence to influence ray paths within the optical substrate as a function of at least one of ray angle or ray position within the substrate, resulting in shift of pupil to mitigate banding effects, and wherein the plurality of refractive index layers incorporates adhesives of different indices.

36. A method to mitigate banding in an output illumination of a waveguide device, comprising:
producing incident light from a light source;
passing the incident light through a light coupler to couple the incident light into an optical substrate such that the coupled light undergoes total internal reflection (TIR) within the optical substrate; and
extracting the TIR light from the optical substrate via a light extractor to produce the output illumination;
wherein the light passes through a debanding optic of the waveguide device such that the debanding optic mitigates a banding effect of the output illumination, wherein the debanding optic comprises a plurality of refractive index layers that provide spatial variation along each TIR path of at least one of diffraction efficiency, optical transmission, polarization, or birefringence to influence ray paths within the optical substrate as a function of at least one of ray angle or ray position within the substrate, resulting in shift of pupil to mitigate banding effects, wherein the plurality of refractive index layers incorporate layers selected from the group consisting of alignment layers, isotropic refractive layers, GRIN structures, antireflection layers, partially reflecting layer, and birefringent stretched polymer layers.

* * * * *